United States Patent
Barak et al.

(10) Patent No.: US 10,423,656 B2
(45) Date of Patent: *Sep. 24, 2019

(54) TAG SUGGESTIONS FOR IMAGES ON ONLINE SOCIAL NETWORKS

(71) Applicant: Facebook, Inc., Menlo Park, CA (US)

(72) Inventors: Dan Barak, Redwood City, CA (US); Yaniv N. Taigman, Los Altos, CA (US); Gil Hirsch, Palo Alto, CA (US); Jorn Martinus Johannes van Dijk, Amsterdam (NL); Dirk John Stoop, Menlo Park, CA (US)

(73) Assignee: Facebook, Inc., Menlo Park, CA (US)

( * ) Notice: Subject to any disclaimer, the term of this patent is extended or adjusted under 35 U.S.C. 154(b) by 275 days.

This patent is subject to a terminal disclaimer.

(21) Appl. No.: 15/491,778

(22) Filed: Apr. 19, 2017

(65) Prior Publication Data

US 2017/0220601 A1    Aug. 3, 2017

Related U.S. Application Data

(63) Continuation of application No. 14/942,659, filed on Nov. 16, 2015, now Pat. No. 9,665,765, which is a (Continued)

(51) Int. Cl.
*G06K 9/60*     (2006.01)
*G06K 9/00*     (2006.01)
(Continued)

(52) U.S. Cl.
CPC ........ *G06F 16/583* (2019.01); *G06F 3/04842* (2013.01); *G06F 16/3322* (2019.01);
(Continued)

(58) Field of Classification Search
CPC ........... G06K 9/00221; G06K 9/00228; G06K 9/00503; G06K 9/6253; G06K 9/00288;
(Continued)

(56) References Cited

U.S. PATENT DOCUMENTS

| 5,164,992 A | 11/1992 | Turk |
| 5,787,186 A | 7/1998 | Schroeder |

(Continued)

FOREIGN PATENT DOCUMENTS

| EP | 2557524 A1 | 2/2013 |
| JP | 2006-510109 | 3/2006 |

(Continued)

OTHER PUBLICATIONS

Zhang et al, Automated Annotation of Human Faces in Family Albums, ACM 2003, Nov. 2, 2003.
(Continued)

*Primary Examiner* — Le H Luu
(74) *Attorney, Agent, or Firm* — Baker Botts L.L.P.

(57) ABSTRACT

In one embodiment, a method includes sending, from a client system of a first user to a server of an online social network, an image portraying at least a first person and determining, for each user in a first set of users, a facial-recognition score with respect to the first person portrayed in the image. The facial-recognition score is based at least in part on a facial-representation associated with the user being compared with the image. The method further includes presenting, at the client system, one or more tag suggestions for the first person portrayed in the image based on the facial-recognition scores and a social-graph affinity associated with one or more users of the first set of users and receiving a selection of a particular tag suggestion by the first user. Each tag suggestion corresponds to a particular user of the first set of users.

20 Claims, 11 Drawing Sheets

Related U.S. Application Data continuation of application No. 14/748,111, filed on Jun. 23, 2015, now Pat. No. 9,275,272, which is a continuation of application No. 13/906,148, filed on May 30, 2013, now Pat. No. 9,143,573, which is a continuation-in-part of application No. 12/922,984, filed as application No. PCT/IL2009/000316 on Mar. 19, 2009, now Pat. No. 8,666,198.

(60) Provisional application No. 61/070,377, filed on Mar. 20, 2008.

(51) Int. Cl.
| | | |
|---|---|---|
| *G06F 16/583* | (2019.01) | |
| *H04L 29/08* | (2006.01) | |
| *G06F 16/51* | (2019.01) | |
| *G06F 16/332* | (2019.01) | |
| *G06F 16/58* | (2019.01) | |
| *H04L 12/58* | (2006.01) | |
| *G06Q 50/00* | (2012.01) | |
| *G06F 3/0484* | (2013.01) | |
| *G06F 3/0482* | (2013.01) | |
| *G06T 11/60* | (2006.01) | |

(52) U.S. Cl.
CPC .......... *G06F 16/51* (2019.01); *G06F 16/5866* (2019.01); *G06K 9/00221* (2013.01); *G06K 9/00228* (2013.01); *G06K 9/00268* (2013.01); *G06K 9/00295* (2013.01); *G06K 9/00302* (2013.01); *G06K 9/00677* (2013.01); *G06Q 50/01* (2013.01); *H04L 51/32* (2013.01); *H04L 67/10* (2013.01); *H04L 67/22* (2013.01); *H04L 67/306* (2013.01); *G06F 3/0482* (2013.01); *G06K 2009/00328* (2013.01); *G06T 11/60* (2013.01)

(58) Field of Classification Search
CPC .......... G06K 9/00295; G06K 9/00302; G06K 9/00268; G06K 9/00677; G06K 2009/00328; H04L 51/32; H04L 67/10; H04L 67/22; H04L 67/306; G06F 17/30979; G06F 17/30247; G06F 17/30244; G06F 3/0482; G06F 3/04842; G06F 16/3322; G06F 16/51; G06F 16/583; G06F 16/5866; G06Q 10/00; G06Q 50/01; G06T 11/60

See application file for complete search history.

(56) References Cited

U.S. PATENT DOCUMENTS

| | | | |
|---|---|---|---|
| 5,963,670 A | 10/1999 | Lipson | |
| 6,035,055 A | 3/2000 | Wang | |
| 6,819,783 B2 | 11/2004 | Goldberg | |
| 6,944,319 B1 | 9/2005 | Huang | |
| 6,990,217 B1 | 1/2006 | Moghaddam | |
| 7,274,822 B2 | 9/2007 | Zhang | |
| 7,295,687 B2 | 11/2007 | Kee | |
| 8,422,747 B1* | 4/2013 | Leung | H04L 51/32 382/118 |
| 8,542,879 B1* | 9/2013 | Nechyba | G06K 9/00228 382/103 |
| 8,666,198 B2* | 3/2014 | Shochat | G06K 9/00221 382/305 |
| 9,143,573 B2 | 9/2015 | Barak | |
| 9,275,272 B2 | 3/2016 | Barak | |
| 2006/0251292 A1 | 11/2006 | Gokturk | |
| 2006/0253491 A1 | 11/2006 | Gokturk | |
| 2007/0076922 A1 | 4/2007 | Living | |
| 2007/0237355 A1 | 10/2007 | Song | |
| 2008/0049976 A1 | 2/2008 | Isomura | |
| 2010/0048242 A1* | 2/2010 | Rhoads | G06K 9/6253 455/556.1 |
| 2010/0135584 A1 | 6/2010 | Tang | |
| 2011/0182485 A1 | 7/2011 | Shochat | |
| 2011/0231747 A1 | 9/2011 | Zuckerberg | |
| 2012/0076367 A1* | 3/2012 | Tseng | G06K 9/00288 382/118 |
| 2012/0114199 A1* | 5/2012 | Panyam | G06K 9/00288 382/118 |
| 2012/0242840 A1* | 9/2012 | Nakfour | G06K 9/00221 348/207.1 |
| 2012/0250950 A1* | 10/2012 | Papakipos | G06K 9/00677 382/118 |
| 2012/0278395 A1* | 11/2012 | Garcia | G06Q 10/00 709/205 |
| 2013/0121540 A1 | 5/2013 | Garcia | |
| 2013/0191416 A1* | 7/2013 | Lee | G06F 16/24534 707/771 |
| 2013/0336543 A1* | 12/2013 | Bennett | G06K 9/6267 382/112 |
| 2015/0193471 A1 | 7/2015 | Shochat | |
| 2016/0070954 A1 | 3/2016 | Barak | |

FOREIGN PATENT DOCUMENTS

| | | |
|---|---|---|
| JP | 2006-221355 | 8/2006 |
| JP | 2006-323507 | 11/2006 |
| JP | 2011-013732 | 1/2011 |
| JP | 2012-133735 A | 7/2012 |
| KR | 10-2012-0092644 A | 8/2012 |
| WO | WO 2009/116049 | 3/2010 |
| WO | WO 2011/017653 A1 | 2/2011 |
| WO | WO 2012/112992 A2 | 8/2012 |

OTHER PUBLICATIONS

International Preliminary Examination Report for PCT/IL09/00316 dated Sep. 30, 2010.
International Search Report and Written Opinion for PCT/IL09/00316 dated Jul. 17, 2009.
Stone-Toward Large-Scale Face Recognition Using Social Network Context, Aug. 2010.
Stone-Autotagging Facebook: Social Network Context Improves Photo Annotation, Jun. 2008.
Mor Naaman et al, Leveraging Context to Resolve Identity in Photo Albums, JCDL, 2005.
FaceBook API Reference, retrieved from Web Archive of Jan. 2007.
Lei Zhang et al, Efficient Propagation for Face Annotation in Family Albums, ACM 2004.
Int'l Search Report and Written Opinion for PCT/US2014/039893, dated Sep. 23, 2014.
Office Action (Notification of Reasons for Rejection) of Japan Patent Office for PF 10380, dated Mar. 10, 2015.
Neeraj Kumar, et al., "FaceTracer: A search engine for large collections of images with faces," Proc. European Conference on Computer Vision (ECCV2008), France, Springer International Publishing AG, Part IV, pp. 340-353, at the following URL: http://www1.cs.columbia.edu/CAVE/publications/pdfs/Kumar_EC CV08.pdf, Oct. 18, 2008.
Kashiko Kodate, et al., "A remote system for lecture attendance management based on the face recognition technology using mobile phones," Automatic Recognition (a monthly magazine), Japan Industrial Publishing Co., LTD., Japan, vol. 17, No. 10, pp. 20-24, Sep. 2, 2004.
Tetsu Matsukawa, et al., "Automatically evaluation of degree of spectators' satisfaction in video sequences based on their facial expressions and face directions," IPSJ Journal, Information Processing Society of Japan, , Japan, vol. 50, No. 12, pp. 3222-3232, Dec. 15, 2009.
Kiyoharu Aizawa, "A collection of personal photos and search thereof," The Journal of the Institute of Image Information and Television Engineers, the Institute of Image Information and Television Engineers, Japan, vol. 64, No. 11, pp. 35-39 (pp. 1571-1575 in serial No.), Nov. 1, 2010.

(56) References Cited

OTHER PUBLICATIONS

Australian Government Examinatin Report No. 1 for Patent Application No. 2014274171, Jan. 21, 2016.
Notice of Preliminary Rejection by the Korean Patent Office for Application No. 10-2015-703684 (with translation), Mar. 14, 2016.
JP Office Action: Notification of Reasons for Rejection of Application No. 2015-563175, dated Aug. 16, 2016.

* cited by examiner

US 10,423,656 B2

TAG SUGGESTIONS FOR IMAGES ON ONLINE SOCIAL NETWORKS

PRIORITY

This application is a continuation under 35 U.S.C. § 120 of U.S. patent application Ser. No. 14/942,659, filed 16 Nov. 2015, which is a continuation under 35 U.S.C. § 120 of U.S. patent application Ser. No. 14/748,111, filed 23 Jun. 2015, now U.S. Pat. No. 9,275,272, which is a continuation under 35 U.S.C. § 120 of U.S. patent application Ser. No. 13/906,148, filed 30 May 2013, now U.S. Pat. No. 9,143,573, which is a continuation-in-part under 35 U.S.C. § 120 of U.S. patent application Ser. No. 12/922,984, filed 15 Feb. 2011, now U.S. Pat. No. 8,666,198, which claims the benefit under 35 U.S.C. § 365(c) of International Patent Application No. PCT/IL09/00316, filed 19 Mar. 2009, which claims the benefit under 35 U.S.C. § 119(e) of U.S. Provisional Patent Application No. 61/070,377, filed 20 Mar. 2008, each of which is incorporated herein by reference.

TECHNICAL FIELD

This disclosure generally relates to online social networks and accessing content within a social-networking environment.

BACKGROUND

A social-networking system, which may include a social-networking website, may enable its users (such as persons or organizations) to interact with it and with each other through it. The social-networking system may, with input from a user, create and store in the social-networking system a user profile associated with the user. The user profile may include demographic information, communication-channel information, and information on personal interests of the user. The social-networking system may also, with input from a user, create and store a record of relationships of the user with other users of the social-networking system, as well as provide services (e.g., wall posts, photo-sharing, event organization, messaging, games, or advertisements) to facilitate social interaction between or among users.

The social-networking system may send over one or more networks content or messages related to its services to a mobile or other computing device of a user. A user may also install software applications on a mobile or other computing device of the user for accessing a user profile of the user and other data within the social-networking system. The social-networking system may generate a personalized set of content objects to display to a user, such as a newsfeed of aggregated stories of other users connected to the user.

The social-networking system may enable its users to upload digital media to the system for viewing by others. Digital media may include digital images, digital video, digital audio, computer games, digital books, digital text, other suitable digital media, or any combination thereof. A user of a social-networking system may upload the digital media (e.g., a digital image) to a file (e.g., an album) associated with their account on the social-networking system. Users of the social-networking system may view the digital media and select and tag a location of the image by selecting a point or area within the digital media and inputting an appropriate description to tag the region. Multiple locations within the media may be tagged. Some of the tags may correspond to particular users or content objects of the social-networking system.

SUMMARY OF PARTICULAR EMBODIMENTS

In particular embodiments, the social-networking system may use facial-recognition processes to generate tag suggestions for images. The social-networking system may compare image information, such as the portrayal of a person in an image, and compare that image information with a set of face signatures to try and predict whether the person portrayed in the image matches the face signature of any user of the online social network. These face signatures may be, for example, facial-representations generated by the social-networking system for particular users of the online social network by analyzing other images where those users are tagged. Thus, the standard tag-suggestion algorithm may be of the form f(n, i), where n is the face signature of a particular user of the online social network, and i is the image information. However, sorting through the face signatures of thousands, or possibly millions, of users is not efficient and may lead to poor predictions. The tag-suggestion algorithm may be improved by using additional information, such as social-graph information, typeahead information, or other suitable information available on the online social network. In other words, the tag-suggestion algorithm may be modified so the function is f(n, i, s), where s is the additional information available on the online social network. In particular embodiments, the additional information may include, for example, social-graph affinity information, tag-history information, or user inputs (e.g., character strings inputted by a user in a typeahead field). A time-decay factor may also be applied to one or more of the factors used in the tag-suggestion algorithm. For example, time-decay may be considered with respect to tag-history information, such that more recent tags are given more weight in the tag-suggestion algorithm. The predictions may then be sent to a user as tag suggestions, which the user may select in order to tag the image for a particular user. The tag suggestions may be presented as the user enters characters into a tag-label field, with the tag suggestions being refined in real-time using typeahead functionality as the user enters more characters into the field.

DESCRIPTION OF EXAMPLE EMBODIMENTS

System Overview

Figure 1:
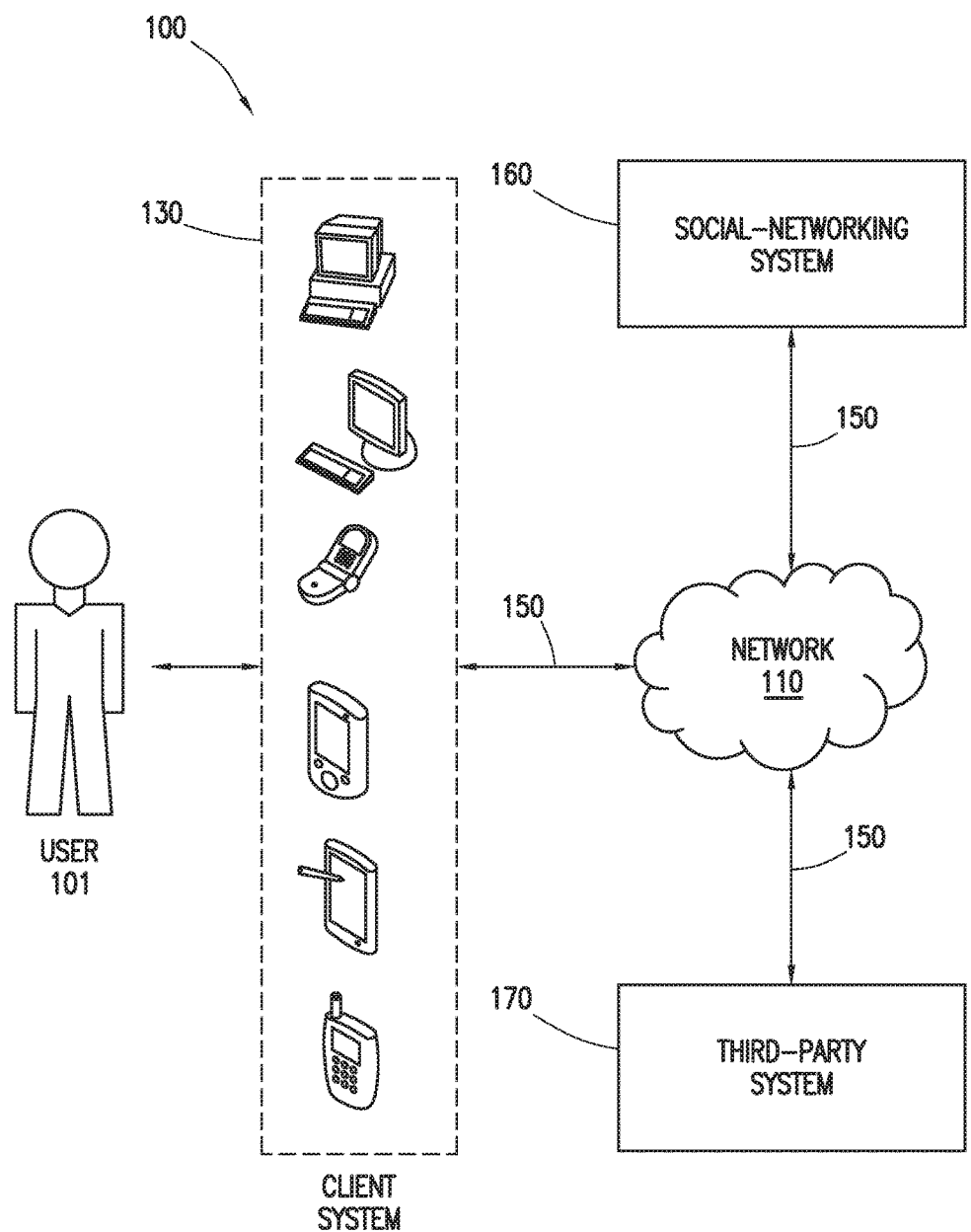
FIG. 1 illustrates an example network environment associated with a social-networking system.

FIG. 1 illustrates an example network environment 100 associated with a social-networking system. Network environment 100 includes a user 101, a client system 130, a social-networking system 160, and a third-party system 170 connected to each other by a network 110. Although FIG. 1 illustrates a particular arrangement of user 101, client system 130, social-networking system 160, third-party system 170, and network 110, this disclosure contemplates any suitable arrangement of user 101, client system 130, social-networking system 160, third-party system 170, and network 110. As an example and not by way of limitation, two or more of client system 130, social-networking system 160, and third-party system 170 may be connected to each other directly, bypassing network 110. As another example, two or more of client system 130, social-networking system 160, and third-party system 170 may be physically or logically co-located with each other in whole or in part. Moreover, although FIG. 1 illustrates a particular number of users 101, client systems 130, social-networking systems 160, third-party systems 170, and networks 110, this disclosure contemplates any suitable number of users 101, client systems 130, social-networking systems 160, third-party systems 170, and networks 110. As an example and not by way of limitation, network environment 100 may include multiple users 101, client system 130, social-networking systems 160, third-party systems 170, and networks 110.

In particular embodiments, user 101 may be an individual (human user), an entity (e.g., an enterprise, business, or third-party application), or a group (e.g., of individuals or entities) that interacts or communicates with or over social-networking system 160. In particular embodiments, social-networking system 160 may be a network-addressable computing system hosting an online social network. Social-networking system 160 may generate, store, receive, and send social-networking data, such as, for example, user-profile data, concept-profile data, social-graph information, or other suitable data related to the online social network. Social-networking system 160 may be accessed by the other components of network environment 100 either directly or via network 110. In particular embodiments, social-networking system 160 may include an authorization server (or other suitable component(s)) that allows users 101 to opt in to or opt out of having their actions logged by social-networking system 160 or shared with other systems (e.g., third-party systems 170), for example, by setting appropriate privacy settings. A privacy setting of a user may determine what information associated with the user may be logged, how information associated with the user may be logged, when information associated with the user may be logged, who may log information associated with the user, whom information associated with the user may be shared with, and for what purposes information associated with the user may be logged or shared. Authorization servers may be used to enforce one or more privacy settings of the users of social-networking system 30 through blocking, data hashing, anonymization, or other suitable techniques as appropriate. In particular embodiments, third-party system 170 may be a network-addressable computing system. Third-party system 170 may be accessed by the other components of network environment 100 either directly or via network 110. In particular embodiments, one or more users 101 may use one or more client systems 130 to access, send data to, and receive data from social-networking system 160 or third-party system 170. Client system 130 may access social-networking system 160 or third-party system 170 directly, via network 110, or via a third-party system. As an example and not by way of limitation, client system 130 may access third-party system 170 via social-networking system 160. Client system 130 may be any suitable computing device, such as, for example, a personal computer, a laptop computer, a cellular telephone, a smartphone, or a tablet computer.

This disclosure contemplates any suitable network 110. As an example and not by way of limitation, one or more portions of network 110 may include an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, or a combination of two or more of these. Network 110 may include one or more networks 110.

Links 150 may connect client system 130, social-networking system 160, and third-party system 170 to communication network 110 or to each other. This disclosure contemplates any suitable links 150. In particular embodiments, one or more links 150 include one or more wireline (such as for example Digital Subscriber Line (DSL) or Data Over Cable Service Interface Specification (DOCSIS)), wireless (such as for example Wi-Fi or Worldwide Interoperability for Microwave Access (WiMAX)), or optical (such as for example Synchronous Optical Network (SONET) or Synchronous Digital Hierarchy (SDH)) links. In particular embodiments, one or more links 150 each include an ad hoc network, an intranet, an extranet, a VPN, a LAN, a WLAN, a WAN, a WWAN, a MAN, a portion of the Internet, a portion of the PSTN, a cellular technology-based network, a satellite communications technology-based network, another link 150, or a combination of two or more such links 150. Links 150 need not necessarily be the same throughout network environment 100. One or more first links 150 may differ in one or more respects from one or more second links 150.

Social Graphs

Figure 2:
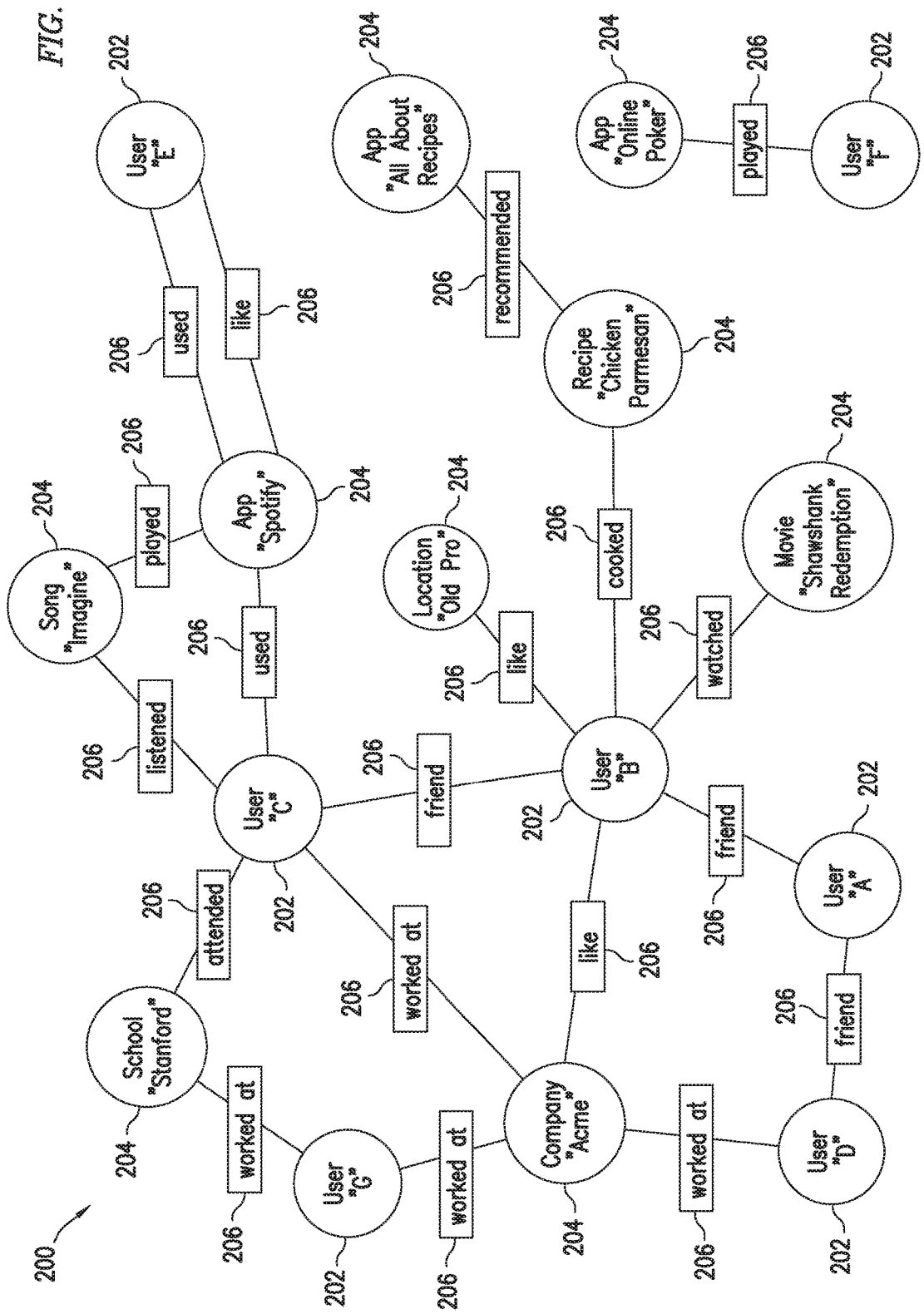
FIG. 2 illustrates an example social graph.

FIG. 2 illustrates example social graph 200. In particular embodiments, social-networking system 160 may store one or more social graphs 200 in one or more data stores. In particular embodiments, social graph 200 may include multiple nodes—which may include multiple user nodes 202 or multiple concept nodes 204—and multiple edges 206 connecting the nodes. Example social graph 200 illustrated in FIG. 2 is shown, for didactic purposes, in a two-dimensional visual map representation. In particular embodiments, a social-networking system 160, client system 130, or third-party system 170 may access social graph 200 and related social-graph information for suitable applications. The nodes and edges of social graph 200 may be stored as data objects, for example, in a data store (such as a social-graph database). Such a data store may include one or more searchable or queryable indexes of nodes or edges of social graph 200.

In particular embodiments, a user node 202 may correspond to a user of social-networking system 160. As an example and not by way of limitation, a user may be an individual (human user), an entity (e.g., an enterprise, business, or third-party application), or a group (e.g., of individuals or entities) that interacts or communicates with or over social-networking system 160. In particular embodiments, when a user registers for an account with social-networking system 160, social-networking system 160 may create a user node 202 corresponding to the user, and store the user node 202 in one or more data stores. Users and user nodes 202 described herein may, where appropriate, refer to registered users and user nodes 202 associated with registered users. In addition or as an alternative, users and user nodes 202 described herein may, where appropriate, refer to users that have not registered with social-networking system 160. In particular embodiments, a user node 202 may be associated with information provided by a user or information gathered by various systems, including social-networking system 160. As an example and not by way of limitation, a user may provide his or her name, profile picture, contact information, birth date, sex, marital status, family status, employment, education background, preferences, interests, or other demographic information. In particular embodiments, a user node 202 may be associated with one or more data objects corresponding to information associated with a user. In particular embodiments, a user node 202 may correspond to one or more webpages.

In particular embodiments, a concept node 204 may correspond to a concept. As an example and not by way of limitation, a concept may correspond to a place (such as, for example, a movie theater, restaurant, landmark, or city); a website (such as, for example, a website associated with social-network system 160 or a third-party website associated with a web-application server); an entity (such as, for example, a person, business, group, sports team, or celebrity); a resource (such as, for example, an audio file, video file, digital photo, text file, structured document, or application) which may be located within social-networking system 160 or on an external server, such as a web-application server; real or intellectual property (such as, for example, a sculpture, painting, movie, game, song, idea, photograph, or written work); a game; an activity; an idea or theory; another suitable concept; or two or more such concepts. A concept node 204 may be associated with information of a concept provided by a user or information gathered by various systems, including social-networking system 160. As an example and not by way of limitation, information of a concept may include a name or a title; one or more images (e.g., an image of the cover page of a book); a location (e.g., an address or a geographical location); a website (which may be associated with a URL); contact information (e.g., a phone number or an email address); other suitable concept information; or any suitable combination of such information. In particular embodiments, a concept node 204 may be associated with one or more data objects corresponding to information associated with concept node 204. In particular embodiments, a concept node 204 may correspond to one or more webpages.

In particular embodiments, a node in social graph 200 may represent or be represented by a webpage (which may be referred to as a "profile page"). Profile pages may be hosted by or accessible to social-networking system 160. Profile pages may also be hosted on third-party websites associated with a third-party server 170. As an example and not by way of limitation, a profile page corresponding to a particular external webpage may be the particular external webpage and the profile page may correspond to a particular concept node 204. Profile pages may be viewable by all or a selected subset of other users. As an example and not by way of limitation, a user node 202 may have a corresponding user-profile page in which the corresponding user may add content, make declarations, or otherwise express himself or herself. As another example and not by way of limitation, a concept node 204 may have a corresponding concept-profile page in which one or more users may add content, make declarations, or express themselves, particularly in relation to the concept corresponding to concept node 204.

In particular embodiments, a concept node 204 may represent a third-party webpage or resource hosted by a third-party system 170. The third-party webpage or resource may include, among other elements, content, a selectable or other icon, or other inter-actable object (which may be implemented, for example, in JavaScript, AJAX, or PHP codes) representing an action or activity. As an example and not by way of limitation, a third-party webpage may include a selectable icon such as "like," "check in," "eat," "recommend," or another suitable action or activity. A user viewing the third-party webpage may perform an action by selecting one of the icons (e.g., "eat"), causing a client system 130 to send to social-networking system 160 a message indicating the user's action. In response to the message, social-networking system 160 may create an edge (e.g., an "eat" edge) between a user node 202 corresponding to the user and a concept node 204 corresponding to the third-party webpage or resource and store edge 206 in one or more data stores.

In particular embodiments, a pair of nodes in social graph 200 may be connected to each other by one or more edges 206. An edge 206 connecting a pair of nodes may represent a relationship between the pair of nodes. In particular embodiments, an edge 206 may include or represent one or more data objects or attributes corresponding to the relationship between a pair of nodes. As an example and not by way of limitation, a first user may indicate that a second user is a "friend" of the first user. In response to this indication, social-networking system 160 may send a "friend request" to the second user. If the second user confirms the "friend request," social-networking system 160 may create an edge 206 connecting the first user's user node 202 to the second user's user node 202 in social graph 200 and store edge 206 as social-graph information in one or more of data stores. In the example of FIG. 2, social graph 200 includes an edge 206 indicating a friend relation between user nodes 202 of user "A" and user "B" and an edge indicating a friend relation between user nodes 202 of user "C" and user "B." Although this disclosure describes or illustrates particular edges 206 with particular attributes connecting particular user nodes 202, this disclosure contemplates any suitable edges 206 with any suitable attributes connecting user nodes 202. As an example and not by way of limitation, an edge 206 may represent a friendship, family relationship, business or employment relationship, fan relationship, follower relationship, visitor relationship, sub scriber relationship, superior/subordinate relationship, reciprocal relationship, non-reciprocal relationship, another suitable type of relationship, or two or more such relationships. Moreover, although this disclosure generally describes nodes as being connected, this disclosure also describes users or concepts as being connected. Herein, references to users or concepts being connected may, where appropriate, refer to the nodes corresponding to those users or concepts being connected in social graph 200 by one or more edges 206.

In particular embodiments, an edge 206 between a user node 202 and a concept node 204 may represent a particular action or activity performed by a user associated with user node 202 toward a concept associated with a concept node 204. As an example and not by way of limitation, as illustrated in FIG. 2, a user may "like," "attended," "played," "listened," "cooked," "worked at," or "watched" a concept, each of which may correspond to a edge type or subtype. A concept-profile page corresponding to a concept node 204 may include, for example, a selectable "check in" icon (such as, for example, a clickable "check in" icon) or a selectable "add to favorites" icon. Similarly, after a user clicks these icons, social-networking system 160 may create a "favorite" edge or a "check in" edge in response to a user's action corresponding to a respective action. As another example and not by way of limitation, a user (user "C") may listen to a particular song ("Imagine") using a particular application (SPOTIFY, which is an online music application). In this case, social-networking system 160 may create a "listened" edge 206 and a "used" edge (as illustrated in FIG. 2) between user nodes 202 corresponding to the user and concept nodes 204 corresponding to the song and application to indicate that the user listened to the song and used the application. Moreover, social-networking system 160 may create a "played" edge 206 (as illustrated in FIG. 2) between concept nodes 204 corresponding to the song and the application to indicate that the particular song was played by the particular application. In this case, "played" edge 206 corresponds to an action performed by an external application (SPOTIFY) on an external audio file (the song "Imagine"). Although this disclosure describes particular edges 206 with particular attributes connecting user nodes 202 and concept nodes 204, this disclosure contemplates any suitable edges 206 with any suitable attributes connecting user nodes 202 and concept nodes 204. Moreover, although this disclosure describes edges between a user node 202 and a concept node 204 representing a single relationship, this disclosure contemplates edges between a user node 202 and a concept node 204 representing one or more relationships. As an example and not by way of limitation, an edge 206 may represent both that a user likes and has used at a particular concept. Alternatively, another edge 206 may represent each type of relationship (or multiples of a single relationship) between a user node 202 and a concept node 204 (as illustrated in FIG. 2 between user node 202 for user "E" and concept node 204 for "SPOTIFY").

In particular embodiments, social-networking system 160 may create an edge 206 between a user node 202 and a concept node 204 in social graph 200. As an example and not by way of limitation, a user viewing a concept-profile page (such as, for example, by using a web browser or a special-purpose application hosted by the user's client system 130) may indicate that he or she likes the concept represented by the concept node 204 by clicking or selecting a "Like" icon, which may cause the user's client system 130 to send to social-networking system 160 a message indicating the user's liking of the concept associated with the concept-profile page. In response to the message, social-networking system 160 may create an edge 206 between user node 202 associated with the user and concept node 204, as illustrated by "like" edge 206 between the user and concept node 204. In particular embodiments, social-networking system 160 may store an edge 206 in one or more data stores. In particular embodiments, an edge 206 may be automatically formed by social-networking system 160 in response to a particular user action. As an example and not by way of limitation, if a first user uploads a picture, watches a movie, or listens to a song, an edge 206 may be formed between user node 202 corresponding to the first user and concept nodes 204 corresponding to those concepts. Although this disclosure describes forming particular edges 206 in particular manners, this disclosure contemplates forming any suitable edges 206 in any suitable manner.

Social Graph Affinity and Coefficient

In particular embodiments, social-networking system 160 may determine the social-graph affinity (which may be referred to herein as "affinity") of various social-graph entities for each other. Affinity may represent the strength of a relationship or level of interest between particular objects associated with the online social network, such as users, concepts, content, actions, advertisements, other objects associated with the online social network, or any suitable combination thereof. Affinity may also be determined with respect to objects associated with third-party systems 170 or other suitable systems. An overall affinity for a social-graph entity for each user, subject matter, or type of content may be established. The overall affinity may change based on continued monitoring of the actions or relationships associated with the social-graph entity. Although this disclosure describes determining particular affinities in a particular manner, this disclosure contemplates determining any suitable affinities in any suitable manner.

In particular embodiments, social-networking system 160 may measure or quantify social-graph affinity using an affinity coefficient (which may be referred to herein as "coefficient"). The coefficient may represent or quantify the strength of a relationship between particular objects associated with the online social network. The coefficient may also represent a probability or function that measures a predicted probability that a user will perform a particular action based on the user's interest in the action. In this way, a user's future actions may be predicted based on the user's prior actions, where the coefficient may be calculated at least in part a the history of the user's actions. Coefficients may be used to predict any number of actions, which may be within or outside of the online social network. As an example and not by way of limitation, these actions may include various types of communications, such as sending messages, posting content, or commenting on content; various types of a observation actions, such as accessing or viewing profile pages, media, or other suitable content; various types of coincidence information about two or more social-graph entities, such as being in the same group, tagged in the same photograph, checked-in at the same location, or attending the same event; or other suitable actions. Although this disclosure describes measuring affinity in a particular manner, this disclosure contemplates measuring affinity in any suitable manner.

In particular embodiments, social-networking system 160 may use a variety of factors to calculate a coefficient. These factors may include, for example, user actions, types of relationships between objects, location information, other suitable factors, or any combination thereof. In particular embodiments, different factors may be weighted differently when calculating the coefficient. The weights for each factor may be static or the weights may change according to, for example, the user, the type of relationship, the type of action, the user's location, and so forth. Ratings for the factors may be combined according to their weights to determine an overall coefficient for the user. As an example and not by way of limitation, particular user actions may be assigned both a rating and a weight while a relationship associated with the particular user action is assigned a rating and a correlating weight (e.g., so the weights total 100%). To calculate the coefficient of a user towards a particular object, the rating assigned to the user's actions may comprise, for example, 60% of the overall coefficient, while the relationship between the user and the object may comprise 40% of the overall coefficient. In particular embodiments, the social-networking system 160 may consider a variety of variables when determining weights for various factors used to calculate a coefficient, such as, for example, the time since information was accessed, decay factors, frequency of access, relationship to information or relationship to the object about which information was accessed, relationship to social-graph entities connected to the object, short- or long-term averages of user actions, user feedback, other suitable variables, or any combination thereof. As an example and not by way of limitation, a coefficient may include a decay factor that causes the strength of the signal provided by particular actions to decay with time, such that more recent actions are more relevant when calculating the coefficient. The ratings and weights may be continuously updated based on continued tracking of the actions upon which the coefficient is based. Any type of process or algorithm may be employed for assigning, combining, averaging, and so forth the ratings for each factor and the weights assigned to the factors. In particular embodiments, social-networking system 160 may determine coefficients using machine-learning algorithms trained on historical actions and past user responses, or data farmed from users by exposing them to various options and measuring responses. Although this disclosure describes calculating coefficients in a particular manner, this disclosure contemplates calculating coefficients in any suitable manner.

In particular embodiments, social-networking system 160 may calculate a coefficient based on a user's actions. Social-networking system 160 may monitor such actions on the online social network, on a third-party system 170, on other suitable systems, or any combination thereof. Any suitable type of user actions may be tracked or monitored. Typical user actions include viewing profile pages, creating or posting content, interacting with content, tagging or being tagged in images (or other types of tag-history information), joining groups, listing and confirming attendance at events, checking-in at locations, liking particular pages, creating pages, and performing other tasks that facilitate social action. In particular embodiments, social-networking system 160 may calculate a coefficient based on the user's actions with particular types of content. The content may be associated with the online social network, a third-party system 170, or another suitable system. The content may include users, profile pages, posts, news stories, headlines, instant messages, chat room conversations, emails, advertisements, pictures, video, music, other suitable objects, or any combination thereof. Social-networking system 160 may analyze a user's actions to determine whether one or more of the actions indicate an affinity for subject matter, content, other users, and so forth. As an example and not by way of limitation, if a user may make frequently posts content related to "coffee" or variants thereof, social-networking system 160 may determine the user has a high coefficient with respect to the concept "coffee". Particular actions or types of actions may be assigned a higher weight and/or rating than other actions, which may affect the overall calculated coefficient. As an example and not by way of limitation, if a first user emails a second user, the weight or the rating for the action may be higher than if the first user simply views the user-profile page for the second user.

In particular embodiments, social-networking system 160 may calculate a coefficient based on the type of relationship between particular objects. Referencing the social graph 200, social-networking system 160 may analyze the number and/or type of edges 206 connecting particular user nodes 202 and concept nodes 204 when calculating a coefficient. As an example and not by way of limitation, user nodes 202 that are connected by a spouse-type edge (representing that the two users are married) may be assigned a higher coefficient than a user nodes 202 that are connected by a friend-type edge. In other words, depending upon the weights assigned to the actions and relationships for the particular user, the overall affinity may be determined to be higher for content about the user's spouse than for content about the user's friend. In particular embodiments, the relationships a user has with another object may affect the weights and/or the ratings of the user's actions with respect to calculating the coefficient for that object. As an example and not by way of limitation, if a user is tagged in first photo, but merely likes a second photo, social-networking system 160 may determine that the user has a higher coefficient with respect to the first photo than the second photo because having a tagged-in-type relationship with content may be assigned a higher weight and/or rating than having a like-type relationship with content. In particular embodiments, social-networking system 160 may calculate a coefficient for a first user based on the relationship one or more second users have with a particular object. In other words, the connections and coefficients other users have with an object may affect the first user's coefficient for the object. As an example and not by way of limitation, if a first user is connected to or has a high coefficient for one or more second users, and those second users are connected to or have a high coefficient for a particular object, social-networking system 160 may determine that the first user should also have a relatively high coefficient for the particular object. In particular embodiments, the coefficient may be based on the degree of separation between particular objects. The lower coefficient may represent the decreasing likelihood that the first user will share an interest in content objects of the user that is indirectly connected to the first user in the social graph 200. As an example and not by way of limitation, social-graph entities that are closer in the social graph 200 (i.e., fewer degrees of separation) may have a higher coefficient than entities that are further apart in the social graph 200.

In particular embodiments, social-networking system 160 may calculate a coefficient based on location information. Objects that are geographically closer to each other may be considered to be more related or of more interest to each other than more distant objects. In particular embodiments, the coefficient of a user towards a particular object may be based on the proximity of the object's location to a current location associated with the user (or the location of a client system 130 of the user). A first user may be more interested in other users or concepts that are closer to the first user. As an example and not by way of limitation, if a user is one mile from an airport and two miles from a gas station, social-networking system 160 may determine that the user has a higher coefficient for the airport than the gas station based on the proximity of the airport to the user.

In particular embodiments, social-networking system 160 may perform particular actions with respect to a user based on coefficient information. Coefficients may be used to predict whether a user will perform a particular action based on the user's interest in the action. A coefficient may be used when generating or presenting any type of objects to a user, such as advertisements, search results, news stories, media, messages, notifications, or other suitable objects. The coefficient may also be utilized to rank and order such objects, as appropriate. In this way, social-networking system 160 may provide information that is relevant to user's interests and current circumstances, increasing the likelihood that they will find such information of interest. In particular embodiments, social-networking system 160 may generate content based on coefficient information. Content objects may be provided or selected based on coefficients specific to a user. As an example and not by way of limitation, the coefficient may be used to generate media for the user, where the user may be presented with media for which the user has a high overall coefficient with respect to the media object. As another example and not by way of limitation, the coefficient may be used to generate advertisements for the user, where the user may be presented with advertisements for which the user has a high overall coefficient with respect to the advertised object. In particular embodiments, social-networking system 160 may generate search results based on coefficient information. Search results for a particular user may be scored or ranked based on the coefficient associated with the search results with respect to the querying user. As an example and not by way of limitation, search results corresponding to objects with higher coefficients may be ranked higher on a search-results page than results corresponding to objects having lower coefficients.

In particular embodiments, social-networking system 160 may calculate a coefficient in response to a request for a coefficient from a particular system or process. To predict the likely actions a user may take (or may be the subject of) in a given situation, any process may request a calculated coefficient for a user. The request may also include a set of weights to use for various factors used to calculate the coefficient. This request may come from a process running on the online social network, from a third-party system 170 (e.g., via an API or other communication channel), or from another suitable system. In response to the request, social-networking system 160 may calculate the coefficient (or access the coefficient information if it has previously been calculated and stored). In particular embodiments, social-networking system 160 may measure an affinity with respect to a particular process. Different processes (both internal and external to the online social network) may request a coefficient for a particular object or set of objects. Social-networking system 160 may provide a measure of affinity that is relevant to the particular process that requested the measure of affinity. In this way, each process receives a measure of affinity that is tailored for the different context in which the process will use the measure of affinity.

In connection with social-graph affinity and affinity coefficients, particular embodiments may utilize one or more systems, components, elements, functions, methods, operations, or steps disclosed in U.S. patent application Ser. No. 11/503,093, filed 11 Aug. 2006, U.S. patent application. Ser. No. 12/976,859, filed 22 Dec. 2010, U.S. patent application Ser. No. 12/977,027, filed 22 Dec. 2010, U.S. patent application Ser. No. 12/978,265, filed 23 Dec. 2010, and U.S. patent application Ser. No. 13/632,869, field 1 Oct. 2012, each of which is incorporated by reference.

Typeahead Processes

In particular embodiments, one or more client-side and/or backend (server-side) processes may implement and utilize a "typeahead" feature that may automatically attempt to match social-graph elements (e.g., user nodes 202, concept nodes 204, or edges 206) to information currently being entered by a user in an input form rendered in conjunction with a requested webpage (such as, for example, a user-profile page, a concept-profile page, a search-results webpage, or another suitable page of the online social network), which may be hosted by or accessible in social-networking system 160. In particular embodiments, as a user is entering text to make a declaration, the typeahead feature may attempt to match the string of textual characters being entered in the declaration to strings of characters (e.g., names, descriptions) corresponding to user, concepts, or edges and their corresponding elements in the social graph 200. In particular embodiments, when a match is found, the typeahead feature may automatically populate the form with a reference to the social-graph element (such as, for example, the node name/type, node ID, edge name/type, edge ID, or another suitable reference or identifier) of the existing social-graph element.

In particular embodiments, as a user types or otherwise enters text into a form used to add content or make declarations in various sections of the user's profile page, home page, or other page, the typeahead process may work in conjunction with one or more frontend (client-side) and/or backend (server-side) typeahead processes (hereinafter referred to simply as "typeahead process") executing at (or within) social-networking system 160 (e.g., within servers 162), to interactively and virtually instantaneously (as appearing to the user) attempt to auto-populate the form with a term or terms corresponding to names of existing social-graph elements, or terms associated with existing social-graph elements, determined to be the most relevant or best match to the characters of text entered by the user as the user enters the characters of text. Utilizing the social-graph information in a social-graph database or information extracted and indexed from the social-graph database, including information associated with nodes and edges, the typeahead processes, in conjunction with the information from the social-graph database, as well as potentially in conjunction with various others processes, applications, or databases located within or executing within social-networking system 160, may be able to predict a user's intended declaration with a high degree of precision. However, social-networking system 160 can also provides user's with the freedom to enter essentially any declaration they wish, enabling users to express themselves freely.

In particular embodiments, as a user enters text characters into a form box or other field, the typeahead processes may attempt to identify existing social-graph elements (e.g., user nodes 202, concept nodes 204, or edges 206) that match the string of characters entered in the user's declaration as the user is entering the characters. In particular embodiments, as the user enters characters into a form box, the typeahead process may read the string of entered textual characters. As each keystroke is made, the frontend-typeahead process may send the entered character string as a request (or call) to the backend-typeahead process executing within social-networking system 160. In particular embodiments, the typeahead processes may communicate via AJAX (Asynchronous JavaScript and XML) or other suitable techniques, and particularly, asynchronous techniques. In particular embodiments, the request may be, or comprise, an XMLHTTPRequest (XHR) enabling quick and dynamic sending and fetching of results. In particular embodiments, the typeahead process may also send before, after, or with the request a section identifier (section ID) that identifies the particular section of the particular page in which the user is making the declaration. In particular embodiments, a user ID parameter may also be sent, but this may be unnecessary in some embodiments, as the user may already be "known" based on the user having logged into (or otherwise been authenticated by) social-networking system 160.

In particular embodiments, the typeahead process may use one or more matching algorithms to attempt to identify matching social-graph elements. In particular embodiments, when a match or matches are found, the typeahead process may send a response (which may utilize AJAX or other suitable techniques) to the user's client system 130 that may include, for example, the names (name strings) or descriptions of the matching social-graph elements as well as, potentially, other metadata associated with the matching social-graph elements. As an example and not by way of limitation, if a user entering the characters "pok" into a query field, the typeahead process may display a drop-down menu that displays names of matching existing profile pages and respective user nodes 202 or concept nodes 204, such as a profile page named or devoted to "poker" or "pokemon", which the user can then click on or otherwise select thereby confirming the desire to declare the matched user or concept name corresponding to the selected node. As another example and not by way of limitation, upon clicking "poker," the typeahead process may auto-populate, or causes the web browser 132 to auto-populate, the query field with the declaration "poker". In particular embodiments, the typeahead process may simply auto-populate the field with the name or other identifier of the top-ranked match rather than display a drop-down menu. The user may then confirm the auto-populated declaration simply by keying "enter" on his or her keyboard or by clicking on the auto-populated declaration.

More information on typeahead processes may be found in U.S. patent application Ser. No. 12/763,162, filed 19 Apr. 2010, and U.S. patent application Ser. No. 13/556,072, filed 23 Jul. 2012, each of which is incorporated by reference.

Digital Images & Tagging Images

In particular embodiments, social-networking system 160 may enable its users to upload digital images to the system for viewing by others. Digital images may include digital photographs, illustrations, geographical maps, screenshots, video, other suitable digital images, or any combination thereof. A user may upload one or more digital images to a server managed by the online social network for storage or for sharing with other users. For example, the user may select a set of images stored on a client system 130, and instruct the client device 130 to establish a network connection with social-networking system 160 and upload the set of images to the online social network. The users may upload the digital image to a particular file or album associated with the user's account on the online social network. One or more other users of the online social network may then be able to view the digital image via social-networking system 160. A user may designate as private (or otherwise restrict access to) one or more images, or grant access to one or more images to certain other users of the online social network, based at least in part on privacy settings of the user.

In particular embodiments, a set of images associated with a first user may be viewable to other users of the online social network. As an example and not by way of limitation, if a second user visits a user profile of the first user, a set of images associated with the first user may be available for viewing by the second user (depending, e.g., on permissions or privacy settings of the first user and the relationship between the first user and the second user). The presentation of images to a user of a social-networking system is discussed in further detail in U.S. patent application Ser. No. 13/715,636, filed 14 Dec. 2012, which is incorporated herein by reference. In particular embodiments, the images associated with the first user may be presented to the second user as a series of albums. As an example and not by way of limitation, the second user may see a webpage associated with the user profile of the first user containing a series of albums. At the bottom of the webpage, the second user may see an option to browse other albums, for example, additional albums associated with the first user, albums associated with another user, or albums associated with the second user's own user profile. The albums presented to the second user may include additional information such as, for example, the titles of the albums, brief descriptions of the albums, or any other information associated with the albums or their photos. In particular embodiments, if the second user "hovers" (e.g., with a mouse) over an album, the second user may be able to "like" or comment on the album. Additionally, in particular embodiments, if the second user hovers over an album, the first N (e.g., five) photographs in the album may be automatically cycled through as the representative image of the album presented to the second user while the second user continues to hover over the album. The first user may determine which photos in the album are presented in the automatic cycle when another user hovers over the album.

In particular embodiments, an image may be associated with particular types of metadata. The metadata associated with an image may be automatically generated (e.g., by the camera that is the source of the image). Automatically-generated metadata associated with an image may, for example, include information regarding the image and may be stored as EXIF (Exchangeable Image File Format) data. The metadata may include information such as a date and time when the image was taken, the location where the image was taken (e.g., GPS coordinates), compression applied to the image, camera model, and camera settings (e.g., resolution, color information, flash usage, exposure, shutter speed, aperture, focal length, or ISO speed). In particular embodiments, metadata associated with an image may be automatically generated but manually edited before uploading to social-networking system 160 (e.g., edited in a photo application on client system 130). In other embodiments, metadata associated with an image may be manually generated (e.g., by the camera user or by the user of client system 130) before uploading to the social-networking system.

In particular embodiments, an image may be scaled to a particular size. Sometimes, an image of a relatively high resolution and thus a relatively large size needs to be displayed within a relatively small area. In practice, this often happens when the screen of the device on which the image is displayed is relatively small, such as the screen of a mobile client system (e.g., a smartphone, mobile phone, tablet computer, laptop computer), although the same need may also arise with other systems having larger screens. As an example and not by way of limitation, an image having a resolution larger than the resolution supported by the viewport of client system 130 may be zoomed out (i.e., scaled down) so that the entire image may be displayed in the viewport. Similarly, the image may be zoomed in (i.e., scaled up) so that just a portion of the image may be displayed in the viewport. Further zooming in may be possible so that the image may be magnified when displayed. In particular embodiments, the display of a mobile device can often have an aspect ratio (e.g., a ratio of width by length) different from an image. Furthermore, an aspect ratio of a display of a mobile device may depend on an orientation (e.g., portrait mode, or landscape mode) of the mobile device. For example, display resolution of a mobile device can be 960 by 640 pixels in landscape mode, or 640 by 960 pixels in portrait mode, while an image stored in social-networking system 160 may have many sizes and aspect ratios (e.g., 1920 by 1080 pixels, 1064 by 1600 pixels, 1600 by 1200 pixels, 1200 by 1200 pixels, 2592 by 1936 pixels, 3264 by 2448 pixels, etc.). In addition, different models (from different manufactures) of mobile devices can have different display resolutions and display aspect ratios. In particular embodiments, the image may be scaled in one or more dimensions based on the size or dimensions of the viewport. In particular embodiments, if the image to be scaled is more "horizontal" than the viewport (e.g., the aspect ratio of the image is greater than the aspect ratio of the viewport), then the image may be scaled to equal the height of the viewport. In particular embodiments, if the image to be scaled is more "vertical" than the viewport (e.g., the aspect ratio of the image is less than the aspect ratio of the viewport), then the image may be scaled to equal the width of the viewport. In particular embodiments, an image maybe scaled before it is cropped to a particular size (e.g., the size of the viewport).

Figure 3:
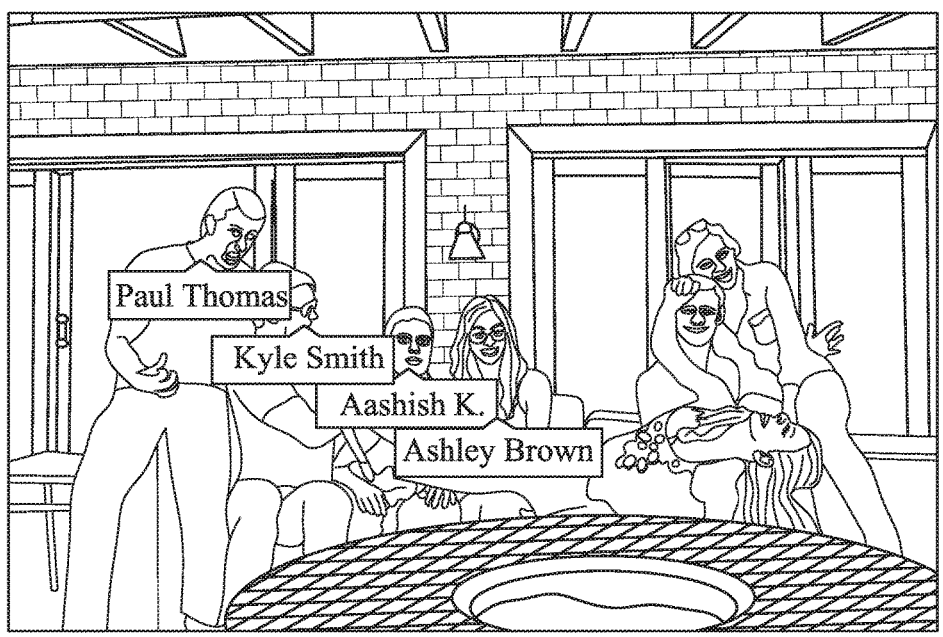
FIG. 3 illustrates an example photograph with tags.

FIG. 3 illustrates an example photograph with tags. In particular embodiments, social-networking system 160 may allow for tagging of digital images. The user who posted the image, or other users of the online social network with access to the image, may view the image to select and tag a location of the image by selecting a point or area within the image. The tagging user may also input a description of the tag, which may describe the object portrayed in the image (e.g., the name or other descriptor of the user or object portrayed in the image). Multiple locations within an image may be tagged. Where the tag corresponds to an area within the image, the tag may be indicated by a border superimposed over the digital image. As an example and not by way of limitation, a particular image may portray one or more persons. One or more of the persons portrayed in the image may be tagged as corresponding to a particular user of the online social network. Typically, the location in the image that portrays a person's face may be selected as corresponding to the tag. In particular embodiment, the description of the tag may be displayed with the image as a tag-label. As an example and not by way of limitation, FIG. 3 illustrates a digital photograph with four users tagged in the image. Here, the users "Paul Thomas", "Kyle Smith", "Aashish K.", and "Ashley Brown" are tagged in the photo. The image illustrated in FIG. 3 also portrays other three people, who are not tagged in the image. A tag-label corresponding to each tag is rendered over the image corresponding to the location of each tag, which in this case is the location of the user portrayed in the image. In FIG. 3, the description in the tag-label is the name of the tagged user, which is displayed adjacent to and below the location where the user is tagged in the image (i.e., below the user's face as portrayed in the image). Although this disclosure describes tagging particular images in a particular manner, this disclosure contemplates tagging any suitable images in any suitable manner.

In particular embodiments, a tag may correspond to a particular edge 206 of social graph 200. Particular nodes of social graph 200 may be connected by tagged-in-type edges 206 with a concept node 204 corresponding to the image. In this way, a particular tag may correspond to a particular user or concept associated with the online social network. The tag-label associated with the tag may then be the name or other descriptor associated with the social-graph entity that corresponds to the tag. In particular embodiments, a tag may be considered a type of metadata associated with the image. As an example and not by way of limitation, if an image is a photo including one or more users of social-networking system 160, the photo may be "tagged" with metadata indicating the names or identifiers of one or more users portrayed in the photo. As another example and not by way of limitation, if the image is a photo taken at a particular location or time, the photo may be tagged with metadata including the location (which may, in particular embodiments, correspond to a concept node 204 in the social graph 200) or with date or time information, as well. Similarly, if the image is a photo that contains buildings, logos or brands, or any other concepts associated with concept nodes 204 in the social graph 200, the photo may be tagged with metadata including the identifiers of the corresponding concept nodes. In particular embodiments, the metadata associated with an image may be automatically generated by social-networking system 160. As an example and not by way of limitation, social-networking system 160 may automatically tag an image with metadata including the identifier of the user who uploaded the image. As another example and not by way of limitation, social-networking system 160 may automatically detect one or more faces in an uploaded image. This may, for example, be done using a face-recognition algorithm. Based on the faces detected in the uploaded image, social-networking system 160 may automatically determine that one or more users of social-networking system 160 are present in the image and may (depending on the users' individual privacy settings) tag the image with metadata including the identifiers of those users present in the image and furthermore generated tagged-in-type edges 206 connecting the user nodes 202 of the identified users with the concept node 204 corresponding to the image. As another example and not by way of limitation, social-networking system 160 may automatically detect locations, buildings, logos or brands, or any other concepts associated with concept nodes in the social graph in an uploaded image (e.g., using computer vision algorithms). Social-networking system 160 may automatically tag the image with metadata including the identifiers of those concept nodes in the social graph that correspond to the automatically detected items.

Tag Suggestions Using Facial Recognition

In particular embodiments, social-networking system 160 may use facial-recognition processes to generate tag suggestions for images. Social-networking system 160 may compare image information, such as the portrayal of a person in an image, and compare that image information with a set of face signatures to try and predict whether the person portrayed in the image matches the face signature of any user of the online social network. These face signatures may be, for example, facial-representations generated by social-networking system 160 for particular users of the online social network by analyzing other images where those users are tagged. Thus, the standard tag-suggestion algorithm may be of the form f(n, i), where n is the face signature of a particular user of the online social network, and i is the image information. However, sorting through the face signatures of thousands, or possibly millions, of users is not efficient and may lead to poor predictions. The tag-suggestion algorithm may be improved by using additional information, such as social-graph information, typeahead information, or other suitable information available on the online social network. In other words, the tag-suggestion algorithm may be modified so the function is f(n, i, s), where s is the additional information available on the online social network. In particular embodiments, the additional information may include, for example, social-graph affinity information, tag-history information, or user inputs (e.g., character strings inputted by a user in a typeahead field). A time-decay factor may also be applied to one or more of the factors used in the tag-suggestion algorithm. As an example and not by way of limitation, time-decay may be considered with respect to tag-history information, such that more recent tags are given more weight in the tag-suggestion algorithm. The predictions may then be sent to a user as tag suggestions, which the user may select in order to tag the image for a particular user. The tag suggestions may be presented as the user enters characters into a tag-label field, with the tag suggestions being refined in real-time using typeahead functionality as the user enters more characters into the field. Although this disclosure describes generating tag suggestions in a particular manner, this disclosure contemplates generating tag suggestions in any suitable manner.

In particular embodiments, social-networking system 160 may receive, from a first user associated with an online social network, a request to view an image associated with the online social network. The request may be received, for example, from a client system 130 associated with the first user. In response to the request, social-networking system 160 may access the image. The image may comprise one or more tags corresponding to a plurality of objects associated with the online social network, respectively. Each object may, for example, correspond to a particular social-graph entity (e.g., a user node 202 or a concept node 204 of social graph 200). Each tag may be associated with a particular location (e.g., a point or area) within the image. As an example and not by way of limitation, referencing FIG. 3, the image illustrates a photo with four users tagged in the photo: "Paul Thomas", "Kyle Smith", "Aashish K.", "Ashley Brown". The tag for each of these users corresponds to a particular location on the photo, which in this case is the region of the photo portraying the face of each user. The tag-labels with their names are displayed just below their faces. In particular embodiments, one of the tags may correspond to the first user (i.e., the requesting user). As an example and not by way of limitation, if the image portrays the requesting user (for example, if the first user happens to be "Ashley Brown" from FIG. 3), the location where the requesting user is portrayed may be tagged with identifying information corresponding to the requesting user (e.g., the name or identifier of the user). Although this disclosure describes requesting and accessing images in a particular manner, this disclosure contemplates requesting and accessing images in any suitable manner.

In particular embodiments, social-networking system 160 may determine a social-graph affinity for one or more users of the online social network. Social-graph affinity may be determined in any suitable manner. The relevance of a social context of an image to a particular user, or of a first user to a second user, may be determined based on information gathered from social graph 200. As an example and not by way of limitation, images available for display to a user (e.g., when the user is viewing another's profile) may include images having the social context(s) of: being associated with or depicting the user, being associated with or depicting other users connected to the user in the social graph (which may be limited to users connected to the user within a particular degree of separation, users within a particular group or organization, the degree of separation between the node corresponding to the tagged object and the user node 202 corresponding to the user accessing the image, users sharing particular interests or affinities with the user, users having a similar profile as the user or a target demographic profile, or users identified as being at the same location at the same time), being associated with or depicting particular users or concepts that the user is following, being associated with or depicting an event the user attended, being associated with or depicting an event that those connected to the user in the social graph were invited to or attended, being associated with or depicting a location or business the user frequents, viewing other images depicting particular users, being depicted in other images in the same album or set of images, accessing profile pages associated with particular users, selecting or creating tags associated with particular users (or other suitable tag-history information), other suitable social contexts, or any combination thereof. Social-networking system 160 may determine the social-graph affinity based on one or more of the factors listed above, or any other relevant factors described herein. Furthermore, the determination of social-graph affinity may further consider time-decay for one or more of the factors listed above, such that more recent actions are more relevant when calculating the social-graph affinity. As an example and not by way of limitation, a number of users depicted in the image who are connected to the user in the social graph may affect the social-graph affinity. As another example, the type of connection between the user and the users depicted in the image may affect the social-graph affinity. Social-networking system 160 may also determine a relevance of the social context(s) of an image to a user based at least in part on the user's interests. The interest value may be based at least in part on whether a social context of the image coincides with a category or categories associated with the user's interests. The interest value may, for example, be based at least in part on whether people, locations, objects, or actions depicted in the image coincide with the category or categories associated with the user's interests. Although this disclosure describes determining social-graph affinity for particular users in a particular manner, this disclosure contemplates determining social-graph affinity for any suitable users in any suitable manner.

Figure 4A:
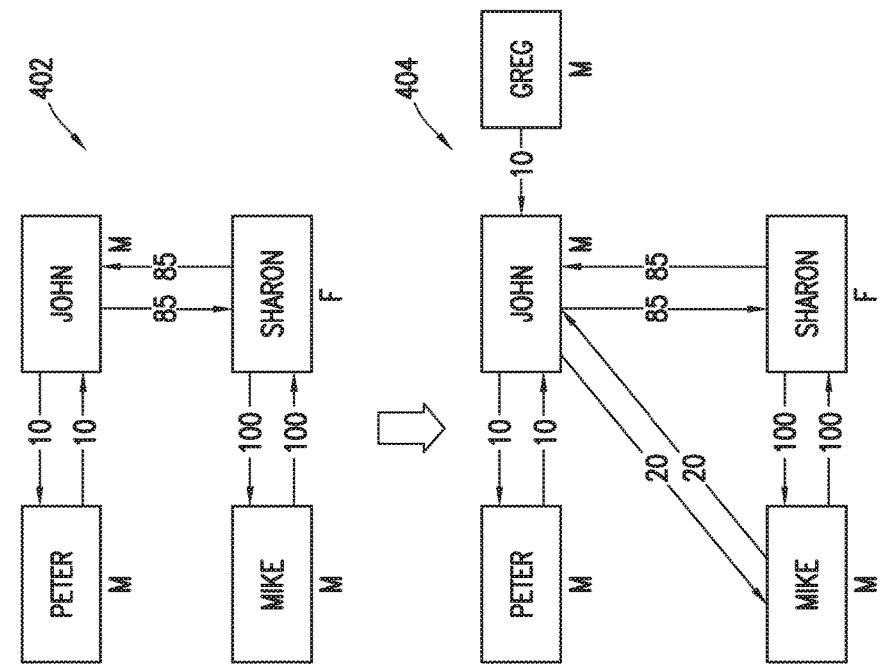
FIGS. 4A-4B illustrate examples of facial recognition using social-graph information.
Figure 4A:
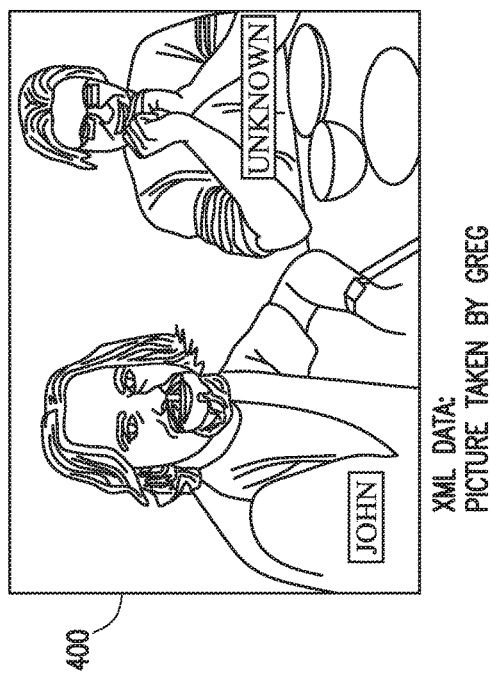
Figure 4A:
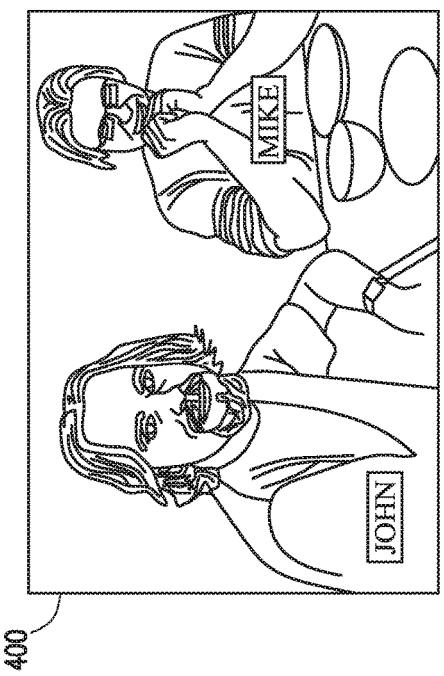

FIG. 4A illustrates an example of facial recognition using social-graph information. Facial recognition may include facial-representation generation and subsequent comparison of multiple facial-representations. Facial recognition using social-graph information may include using relationship mapping functionality employing multi-dimensional context. In particular embodiments, social-networking system 160 may provide tag suggestions for images where at least one persons portrayed in the image are known (i.e., at least one person portrayed in the image is tagged). As an example and not by way of limitation, the functionality may be understood and visualized by starting with a, image, represented by an image 400, which includes images of multiple people, at least one of whom is known. In the example illustrated in image 400, one person portrayed in the image, here labeled John, is known (i.e., the image includes a tag corresponding to the user "John" of the online social network). A second person portrayed in the image, here labeled Unknown, is not known (i.e., there is no tag corresponding to this person). In this example, the person who took the picture represented by image 400 is also known, and has been identified as the user "Greg" of the online social network.

In particular embodiments, in order to identify an unknown person portrayed in an image, an iterative relationship map is generated based on, inter alia, visually sensible information contained in image 400 and also on additional, non-visually sensible information related to the above-mentioned persons who either appear in the image or are otherwise associated therewith. In particular embodiments, the non-visually sensible information may comprise meta-data attached to or associated with image data. The image data typically includes images in JPEG or PNG format, although any suitable image format may be used. The meta-data may be data in XML or other suitable formats derived from social-networking system 160, as well as data conventionally attached to image data, such as XML, EXIF tag, or other standard image contextual data. Typically, in the present example, John and Peter are uniquely known on the online social network, and each may each correspond to a particular user node 202 of social graph 200. The person who took the picture containing the image represented by image 400 is identified as Greg (for example, by XML data attached to the image data of image 400). Greg may also correspond to a particular user node 202 of social graph 200.

In particular embodiments, generation of the relationship map may begin from a pre-existing iterative relationship map, here termed a precursor relationship map, represented by a diagram 402, containing information on relationships of a known person or known persons in the image, in this case John. Generation of the relationship map employs information from image 400, such as that John appears in the image together with an unknown individual. The precursor relationship map is also based on the inter-personal relationship data received from social-networking system 160, such as social graph 200, as well as inter-personal relationship data derived from earlier instances of operation of the relationship mapping functionality of particular embodiments based on analysis of other images.

In particular embodiments, social-graph affinity may be based on tag-history information. Tag-history information may include, for example, information describing users that have been tagged together in particular images, which images particular users are tagged in, which users created these tags, the tag count in particular images, the tag location, other suitable tag-related information, or any combination thereof. Diagram 402, which may be based on or represent a portion of social graph 200, indicates that the user "John", a male, is connected to the user "Sharon", a female, who in turn is connected to the user "Mike", a male. John is also connected to the user "Peter", a male. The symbology employed in the relationship map indicates various parameters, including strength of the relationship between two users (i.e., the social-graph affinity between the two users), which may be measured as an affinity coefficient. In the example illustrated in FIG. 4A, a number inserted in the connection between users indicated a calculated affinity coefficient of a user with respect to another user as indicated by the direction of the arrow between the two users. The higher the affinity coefficient, the stronger the relationship in the illustrated example. As an example and not by way of limitation, in the example of diagram 402, the affinity coefficient between John and Mike is expected to be relatively strong, by virtue of the relationship between John and Sharon (85) and the relationship between Sharon and Mike (100), notwithstanding that it is an indirect connection via Sharon. This strength may be evidenced, for example, by multiple images in which Sharon appears with Mike and separately with John. In other words, notwithstanding the fact that Mike and John have never been tagged in a photo together previously, because they have both been tagged with their mutual friend Sharon in previous photos, they may have a relatively week affinity coefficient with respect to each other. As another example and not by way of limitation, the relationship between John and Peter is relatively weak (10), notwithstanding that it is a direct relationship. For example John and Peter may both appear together only in one image and that image may include many other people. In other words, since John and Peter have both been tagged in a single photo together previously, they may have a relatively weak affinity coefficient with respect to each other. Although this disclosure describes determining a social-graph affinity based on particular tag-history information in a particular manner, this disclosure contemplates determining a social-graph affinity based on any suitable tag-history information in any suitable manner.

In particular embodiments, a first set of users of the online social network may be selected as possible candidate users for matching the unknown person portrayed in an image. Social-networking system 160 may then determine for each candidate user a facial-recognition score with respect to the unknown person portrayed in the image. The facial-recognition score may be calculated based on a variety of factors, as discussed herein. The facial-recognition score for each user may measure a probability that the user matches the unknown user portrayed in the image. Users may be selected based on a variety of factors, such as social-graph information or tag-history information. In particular embodiments, the list of candidate persons may be prioritized by analyzing relationships of the persons appearing in the precursor relationship map (e.g., social graph 200). In practice, the precursor relationship map may include millions of people. In this way, prioritization of the persons appearing in the precursor relationship map may be carried out. This prioritization may include, for example, image attribute filtering, which eliminates persons who are of a gender other than the gender of the unknown person in the image. As an example and not by way of limitation, referring to FIG. 4A, in diagram 402 the users appearing are Mike and Sharon. Image attribute filtering is used to eliminate Sharon, since image attribute recognition indicates that the unknown person in image 400 is a male. Prioritization may also be based on the degree of separation between users. Users corresponding to user nodes 202 within a threshold degree of separation of another relevant node in social graph 200 may be selected. As an example and not by way of limitation, first- or second-degree connections with respect to the user who created the image, or one or more of the users tagged in the image may be selected. Similarly, users corresponding to user nodes 202 within a threshold degree of separation of the concept node 204 corresponding to the image may be selected. In particular embodiments, users having at least a predetermined relationship with a known person in an image may be used. As an example and not by way of limitation, referencing FIG. 4A, since the user John is already tagged in the image 400, users having a predetermined relationship with John may be selected to be analyzed to see whether they match the unknown person portrayed in image 400. In particular embodiments, social-networking system 160 may generate a list of candidate users who have a temporal association with a tagged user in an image based on visually-sensible information contained in the image as well as the non-visually sensible information. Such information may include, for example, social-graph information, tag-history information, image meta-data, users of the online social network who are tagged in the image, the time and geographical location where an image was created (e.g., the GPS coordinates where a digital photo was taken), the album on the online social network with which the image is associated, the user of the online social network who created the image, the user who created particular tags within the image, the time since each tag in the image was created, other suitable information, or any combination thereof. As an example and not by way of limitation, social-networking system 160 may identify one or more user who appeared in (i.e., are tagged in) other images in same album as the image being analyzed, or users that appeared in other albums taken in the same geographical location at the same time. These users would typically be on an initial list of candidate users. Although this disclosure describes selecting particular users for facial recognition analysis in a particular manner, this disclosure contemplates selecting any suitable users for facial recognition analysis in any suitable manner.

In particular embodiments, social-networking system 160 may calculate a facial-recognition score based at least in part on a social-graph affinity for one or more of the candidate users. Thus, the prioritization may rely on the strengths of relationships (e.g., the social-graph affinity or a calculated affinity coefficient) between a known person (e.g., a user tagged in the photo, or a user who created the photo), and various other users in the precursor relationship map (e.g., other users connected to that user in social graph 200). The prioritization may give higher priority (i.e., a higher facial-recognition score) to users having the strongest relationship (i.e., strongest social-graph affinity) with the known person. As an example and not by way of limitation, referencing FIG. 4A, Mike may be prioritized over Peter because of Mike has a higher affinity coefficient with respect to the known user John. The prioritization is given expression in operation by initially performing facial recognition on the images of persons having highest priority (i.e., having the best facial-recognition scores). Thus, when the pool of candidates includes millions of people, the prioritization is of great importance. In particular embodiments, that tag-history information may be considered separately or as part of the determined social-graph affinity. In other words, when calculating a facial-recognition score, the tag-history information may be considered as an independent signal, or as part of the determined social-graph affinity. Although this disclosure describes calculating a facial-recognition score in a particular manner, this disclosure contemplates calculating a facial-recognition score in any suitable manner.

In particular embodiments, social-networking system 160 may calculate a facial-recognition score based at least in part on a facial-representation associated with a user of the online social network as compared with the portrayal of a person in an image. The facial-representation associated with a user may be compared with the image (e.g., compared with the face of a person portrayed in the image). Facial-representation generation, which may be entirely conventional, may be performed on the unknown person in an image. The resulting facial-representation may be compared with previously generated facial-representations of the candidate users (which may be stored by social-networking system 160, for example, in association with the respective user-profile information associated with each candidate user) in accordance with and in the order established by the above-described prioritization. The result of the comparison may be a metric depicting the similarity between the two different facial-representations. The comparison may be cut off and a candidate may be selected when a combined priority/similarity threshold is reached for a given candidate person. The priority/similarity threshold may take into account the similarity of a facial-representation of a candidate user to the facial-representation of the unknown person portrayed in the image. The priority of that candidate user established by the above-referenced prioritization and a metric that indicates the quality of the facial-representation of the candidate user. This metric may be a function of various parameters, such as, for example, the number of images of that candidate user that have been analyzed by social-networking system 160 and previous user feedback. An example quality metric, Qi, is given by the following expression:

$$Qi = \left[\left[1-\left(\frac{1}{n}\right)^2\right] \times q\right] \times \left[\frac{tp}{fp} \times \left(\frac{1}{fn}\right)^2\right],$$

where n is the count of images including the facial-representation, fp is the percent of false positives indicated so far by user feedback, tp is the percent of true positives indicated so far by user feedback, fn is the percent of false negatives indicated so far by user feedback, and q is a weighting of variance of the vectors representing the images that compose the facial-representation. The match between the unknown person portrayed in the image and the selected candidate user may then be employed to provide an initial revised relationship map, such as the one illustrated in diagram 404 of FIG. 4A. In the example illustrated in FIG. 4A, the unknown person is tentatively identified as Mike and the relationship between Mike and John is initially indicated as being a relatively weak relationship (i.e., the calculated affinity coefficient is low). Mike may then be transmitted as a tag suggestion to a user viewing or posting the image. It is noted that Greg also appears in diagram 404 as having a weak one-directional relationship with John, which is based on Greg having taken the digital image 400. If any positive user feedback is received via a social network confirming that the person whose image is believed to be Mike is indeed Mike (e.g., a user tags Mike in the image), this feedback may used to strengthen the relationship between Mike and John as expressed in a subsequent revised relationship map (not shown), and to strengthen the metric which indicates the quality of the facial-representation of Mike. Conversely, receipt of negative feedback indicating that the person whose image is believed to be Mike is not Mike (e.g., a user tags someone else in the image) may weaken the relationship between Mike and John as expressed in a subsequent revised relationship map, and weakens the metric which indicates the quality of the facial-representation of Mike. Additionally it may serve as a negative example for future facial-representation comparison. Although this disclosure describes performing facial recognition on images in a particular manner, this disclosure contemplates performing facial recognition on images in any suitable manner.

The precursor relationship map described previously may also include a facial-representation, which may be produced by conventional facial-representation generation techniques. The facial-representation may be in the form of a vector, which identifies each of the persons in the map. In connection with facial recognition, particular embodiments may utilize one or more systems, components, elements, functions, methods, operations, or steps disclosed in U.S. Pat. No. 5,164,992, issued 17 Nov. 1992, U.S. Pat. No. 6,292, 575, issued 18 Sep. 2001, and PCT Application No. PCT/IL2011/000287, filed 31 Mar. 2011, each of which is incorporated by reference. The precursor relationship map may also include an indication of whether each person in the map is a male or female (in the example illustrated in FIGS. 4A and 4B, indicated by the letters M and F). This indication may be provided by various sources, such as from social-graph information provided by social-networking system 160 or by operation of image attribute recognition. As an example and not by way of limitation, image attribute analysis may be applied to image 400 in order to determine whether the unknown individual is a male or a female. Additional attributes may be generated by image attribute recognition and can be included within the precursor relationship map. These may include complexion, eye color and hair color. Conventional image attribute recognition is known to have accuracy of above 90% in determining gender. In connection with image attribute recognition, particular embodiments may utilize one or more systems, components, elements, functions, methods, operations, or steps disclosed in U.S. Pat. No. 6,990,217, issued 24 Jan. 2006, which is incorporated by reference. The precursor relationship map and subsequent relationship maps may also include information from visual background analysis. In particular embodiments, the facial-recognition score may be based in part on additional signals, such as device information (e.g., what kind of device the image was created on, where different devices may be used to photograph different people), or time and location information (both of users and of images photos). In connection with time and location information, particular embodiments may utilize one or more systems, components, elements, functions, methods, operations, or steps disclosed in U.S. patent application Ser. No. 12/763,171 and U.S. patent application Ser. No. 13/042,357, each of which is incorporated by reference.

Figure 4B:
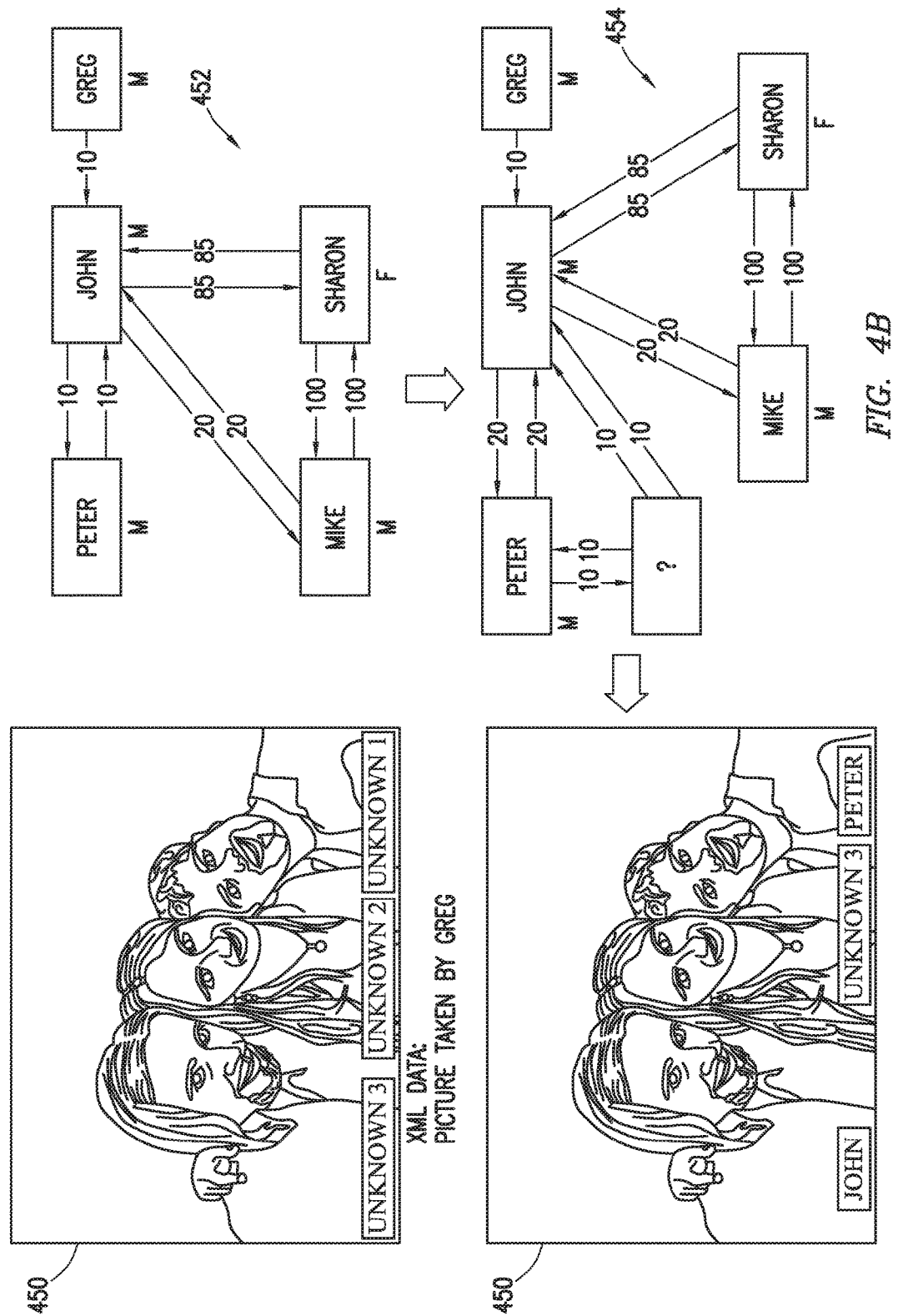

FIG. 4B illustrates another example of facial recognition using social-graph information. In particular embodiments, social-networking system 160 may provide tag suggestions for images where no persons portrayed in the image are known. In other words, social-networking system 160 may still attempt to identify unknown persons portrayed in an image even when no users are tagged in the image. As an example and not by way of limitation, the functionality may be understood and visualized by starting with an image, represented by image 450, which includes images of multiple people. In the present example, exemplified by image 450, three persons here labeled Unknown 1, Unknown 2 and Unknown 3, appear. All are not known (i.e., none are tagged). In this example, the user who uploaded the picture to the social network site represented by image 450 is known to be John. In particular embodiments, social-networking system 160 may employ relationship mapping (as previously described) to identify one or more of the unknown persons in an image. Generation of a relationship map may begin from a pre-existing iterative relationship map, for example a precursor relationship map, represented by a diagram 452, which is identical to diagram 404. This precursor relationship map contains information on relationships of a known person or known persons in the previously analyzed image, in this case John, Peter, Greg and Sharon. This information may based on the inter-personal relationship data received from one or more online social networks (e.g., social graph 200), as well as inter-personal relationship data derived from the earlier instance of operation of the relationship mapping functionality of the present invention based on analysis of other images.

Diagram 452 indicates that John, a male, is known to have a strong social relationship (i.e., a high affinity coefficient) with Sharon, a female, who in turn has a strong social relationship with Mike, a male. John is also indicated to have weak social relationships (i.e., low affinity coefficients) with Peter, Greg and Mike, who are males. In particular embodiments, candidate users having at least a predetermined relationship with the known user, John, who uploaded the picture represented by image 450, are sought. This may be done by starting with the users appearing in the precursor relationship map 452, or users connected to these users within social graph 200. As noted above, social-networking system 160 may then prioritize the selected users appearing in the precursor relationship map in order to generate one or more tag suggestions for the unknown persons portrayed in the image. In this example, the prioritization may be based on the strength of the relationship between the known users, John, and other users in the relationship map 452 and gives much higher priority to users having the strongest relationship (i.e., highest affinity coefficient) with the known person, John. Thus in the present example, John is prioritized above all, as having the strongest relationship to himself. In other words, it is likely that John posted a photo that portrays himself. Mike has the next highest priority, assuming that Sharon may eliminate by social-networking system 160 based on her gender. After Mike, Peter has a higher priority than Greg, notwithstanding that both of their relationship arrows are given the same numerical score, since the relationship between John and Greg is only known to be unidirectional.

In particular embodiments, prioritization may be based on a certainty metric, such as a facial-recognition score, as described previously. As an example and not by way of limitation, in the example illustrated in FIG. 4B, the probability that John is one of the unknown persons in the image 450 initially may not be particularly high. In view of this, a prioritization cut-off may be implemented, such that Peter and Greg, who have relatively weak relationships with John, may not be considered to be candidates (and subsequently may not be generated as tag suggestions). As noted above, prioritization may be given expression in operation of particular embodiments by initially performing facial recognition on the persons having highest priority, starting with John. In other words, social-graph affinity may be used as a threshold factor for determining which users to subsequently performing facial recognition analysis. Alternatively, social-graph affinity may be used as an independent signal when calculating a facial-recognition score, along with the measure of facial recognition analysis. Facial-representation generation may be performed on the unknown persons in image 450. The resulting facial-representation may then be compared with previously generated facial-representations of the candidate users in accordance with and in the order established by the above-described prioritization. As an example and not by way of limitation, facial-representation generation may be performed on the three unknown images within image 450. Thereafter comparison of the facial-representations of the three unknown persons portrayed in image 450 may be carried out in accordance with the prioritized list generated above. The priority/similarity threshold for each may evaluated, and thus Unknown 1 may be recognized as John, while Unknown 2 and Unknown 3 may yet to be recognized. Following recognition of Unknown 1 as John, in order to recognize the remaining unknown persons in the image, an additional prioritization iteration may carried out by social-networking system 160. In this additional prioritization iteration, the identification of Unknown 1 as John increases the facial-recognition score for users known to have a relationship with John (e.g., are connected to John in social graph 200), and thus Peter may be considered to be a candidate. Greg may still not be considered as a candidate since his relationship with John is unidirectional. Mike may not be considered again inasmuch as a previous comparison of Mike with the generated unknown facial-representation generated a low similarity metric. A new priority list may include Peter, based on his relationship with John, who is now tagged in image 450. Facial-representations of the remaining unknown persons in image 450 may be compared with previously generated facial-representations of the candidate users in accordance with and in the order established by the revised prioritization. As an example and not by way of limitation, Unknown 2 may be recognized as Peter, while Unknown 3 may yet to be recognized. Following recognition of Unknown 2 as Peter, in order to recognize the last unknown person in the image, a further prioritization iteration may be carried out. In this further prioritization iteration, the identification of Unknown 2 as Peter may indicate that there are two starting points for generation of candidate lists, John and Peter, both of whom have now been tagged in image 450. Two candidate list subsets may thus be provided and used to generate a single prioritized list by using weighted graph combination techniques. At this stage a further relationship map may be generated, as illustrated in diagram 454. In this relationship map, the indicated relationship between John and Peter is strengthened. Relationships between Unknown 3, John and Peter are also indicated based on image 450. Unknown 3 may then be recognized in the future by comparing the facial-representation of Unknown 3 with facial-representations of persons who are subsequently indicated to have relationships with John or with the other users appearing in the relationship map 454.

Figure 5:
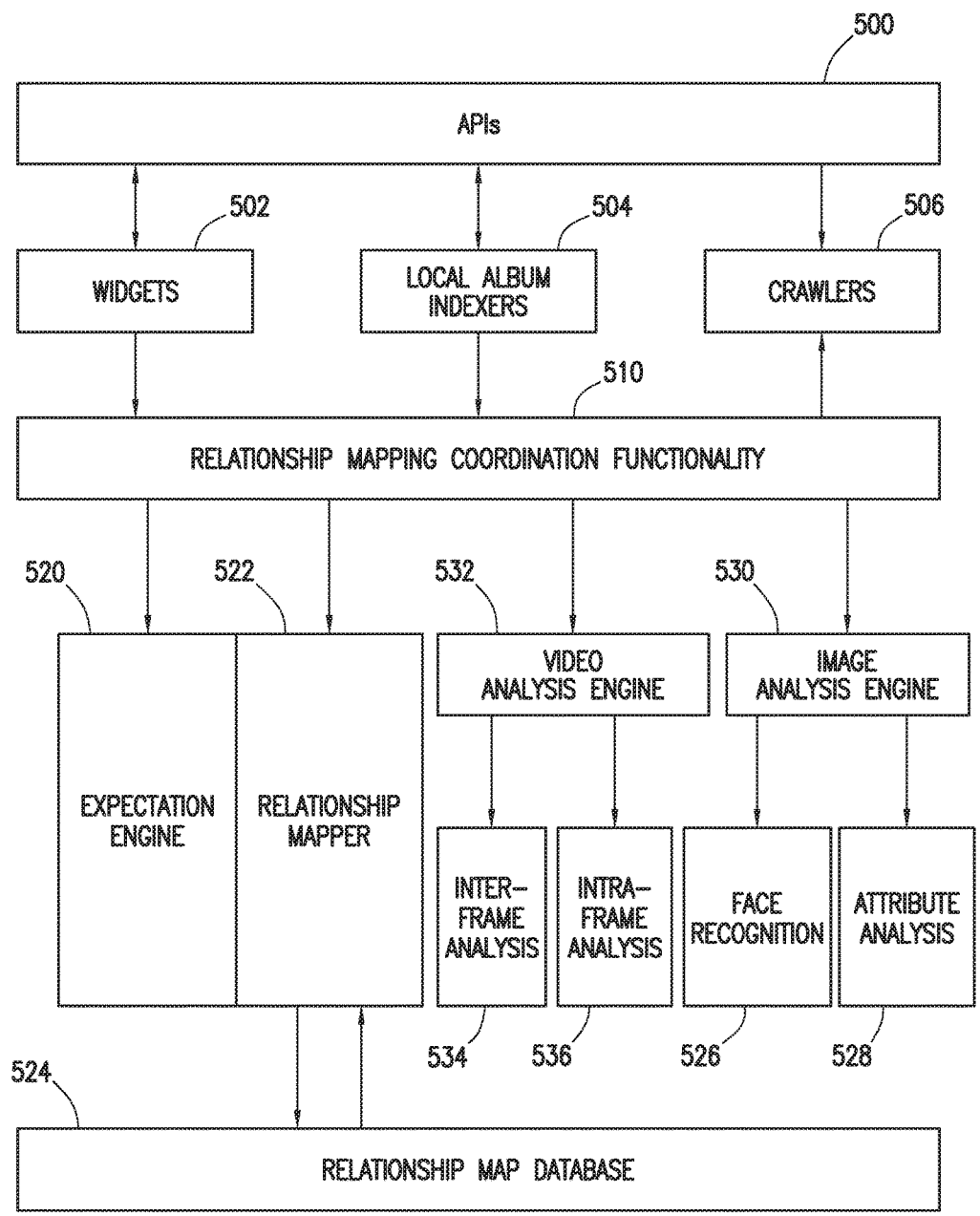
FIG. 5 illustrates an example system for performing facial recognition using social-graph information.

FIG. 5 illustrates an example system for performing facial recognition using social-graph information. This system may be sub-system of or independent of social-networking system 160. In particular embodiments, the system may utilize one or more publicly available social network application program interfaces (APIs) 500, such as the APIs provided by FACEBOOK, MYSPACE, GOOGLE, FLICKR, TWITTER, or other suitable systems. The system may communicate interactively with the APIs 500, for example, via widgets 502, which may be embedded within applications, or standalone applications such as local album indexers 504. The system may automatically receive updates from APIs 500 via crawlers 506, such as, for example, image crawlers, video crawlers, or relationship crawlers, such as those used by spammers. Elements 502, 504, and 506 may include user interface functionality. In particular embodiments, the system does not include APIs 500, where the system may instead access social-networking system 160 directly, for example, by being a sub-system within social-networking system 160. The user interface functionality may be used to provide positive or negative feedback regarding whether a recognized person is indeed the named person. In other words, user interface functionality may be used to provide feedback indicating whether a particular tag suggestion is correct, or to allow a user to choose one suggestion from a plurality of suggestions. This feedback may be communicated to relationship mapping coordination functionality 510 and used to strengthen or weaken the facial-representation, a determined social-graph affinity, or a determined facial-recognition score. Additional user interface functionality may include search functionality operative to search the generated relationship map or social graph 200. Search terms may include, for example, a simple character string comprising one or more characters, uniquely identified persons (e.g., user identifiers), an additional image of a person, relationships between various persons, other system generated attributes such as gender or facial-representation resemblance, other suitable search terms, or any combination thereof. Search functionality may be provided directly via a user interface or indirectly by exposing the relationship mapper 522 information to the online social network. In particular embodiments, standalone applications may include running on an end-user machine and performing some or all of the image attribute analysis, facial-representation generation, or facial-representation comparison. A local album indexer 504 may perform the image attribute analysis, facial-representation generation, or facial-representation comparison operations, and communicate with the relationship mapping coordination functionality 510 to generate a unified facial-representation from multiple images of a single person. In particular embodiments, relationship mapping coordination functionality may be responsive both to API sourced information from APIs 500 and to user inputs received via communicators such as widgets 502, local album indexers 504, or crawlers 506, and coordinates operation of the various elements of the system. In particular embodiments, the system may include an expectation engine 520, which may interface with the relationship mapper 522, which in turn may interface with a relationship map database 524. These elements may utilize information obtained by functionality 510 from face recognition functionality 526 and attribute analysis functionality 528 via an image analysis engine 530. A video analysis engine 532 may cooperate with interframe analysis functionality 534 and intraframe analysis functionality 536, which provide information based on temporal sequences of frames in video content. In particular embodiments, relationship mapper 522 functionality may include providing access to social graph 200 (i.e., a relationship map), and access to social-graph information, such as information regarding the strengths of the relationships between various users of the online social network (e.g., a data store of coefficient affinities determined by social-networking system 160). Social graph 200 may be stored at least partially in memory and may be available persistently via relationship database 524. Although this disclosure describes and FIG. 5 illustrates a particular system for performing facial recognition in a particular manner, this disclosure contemplates any suitable system for performing facial recognition in any suitable manner.

In particular embodiments, social-networking system 160 may generate one or more tag suggestion an unknown person portrayed in an image based on the determined facial-recognition scores determined for each users in a first set of users. Each tag suggestion may correspond to a particular user of the first set of users. As an example and not by way of limitation, expectation engine 520 may generate prioritized lists of candidate persons, listing persons expected to appear in an image, its associated data and social network data. The expectation engine 520 may access social graph 200 to identify a first set of candidate users. In other words, the expectation engine 520 may generate one or more tag suggestions for an unknown person portrayed in an image based on previously determined facial-recognition scores for candidate users. Expectation engine may access the social graph 200 directly or via the online social network API 500 for a list of candidate users having a temporal association with the known person based on visually-sensible information contained in the image, non-visually sensible information typically available as meta-data, typeahead inputs, social-graph information, tag-history information, other suitable information, or any combination thereof. Subsequently, the expectation engine 520 may perform prioritization of the candidate persons expected to appear in the image by interfacing with relationship mapper 522 and by utilizing image attribute filtering provided by the image analysis engine 530. The prioritization may rely on the strength of relationship between the known person and other persons in the relationship map and gives much higher priority to persons having the strongest relationship with the known person (e.g., the highest social-graph affinity/affinity coefficient). For example, prioritization may rely on facial-recognition scored that is determined in part based on the social-graph affinity determined for each candidate user and a facial-representation associated with each candidate user. The expectation engine 520 may combine the weighted graphs associated with known users in the image, as provided by relationship mapper 522 by utilizing weighted graph combination algorithms. In particular embodiments, social-networking system 160 may generate tag suggestions just for those users having facial-recognition scores greater than a threshold facial-recognition score. Users having a facial-recognition score greater than the threshold score may then be identified by social-networking system 160 and generated as the tag suggestions. Although this disclosure describes generating particular tag suggestions in a particular manner, this disclosure contemplates generating any suitable tag suggestions in any suitable manner.

FIGS. 6A-6E illustrate an example photograph with tag suggestions. As an example and not by way of limitation, referencing FIGS. 6A, when a user accesses the image, the user may tag the image by selecting a location on the image.

Figure 6A:
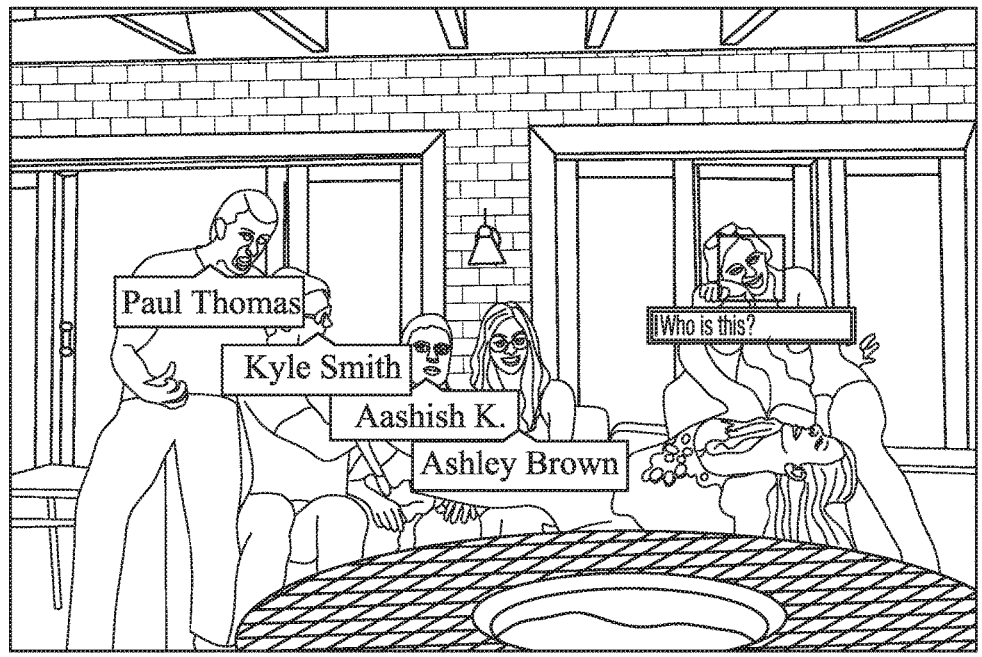
FIGS. 6A-6E illustrate an example photograph with tag suggestions.
Figure 6B:
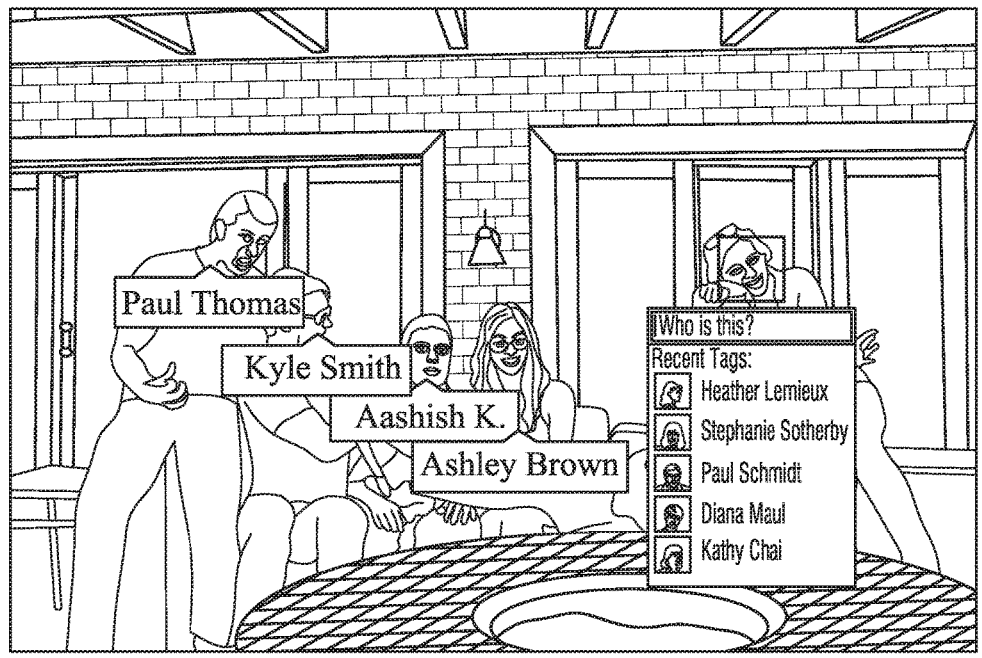
Figure 6C:
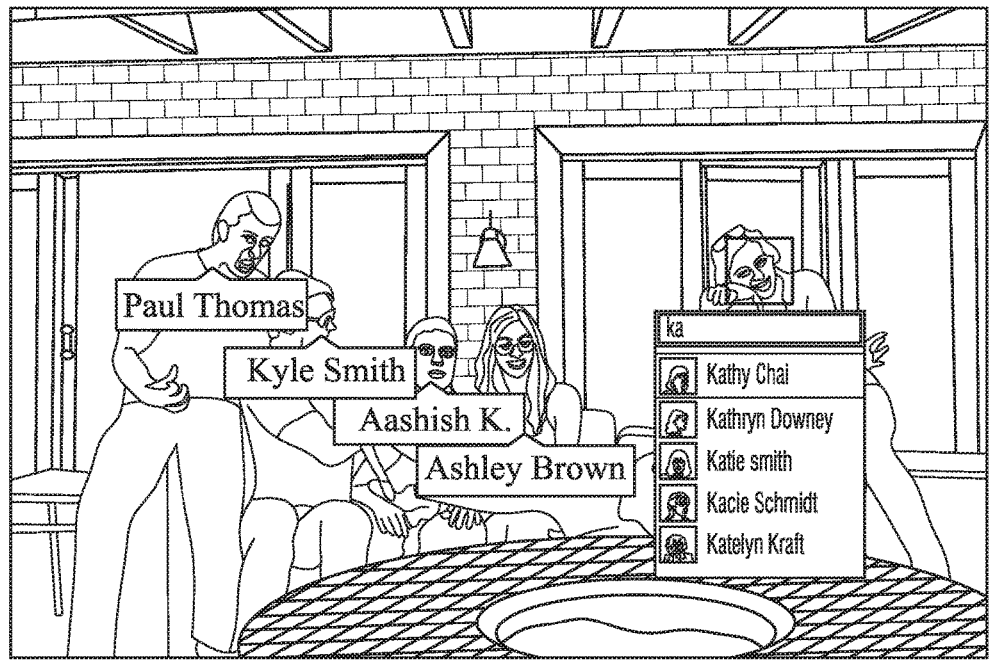
Figure 6D:
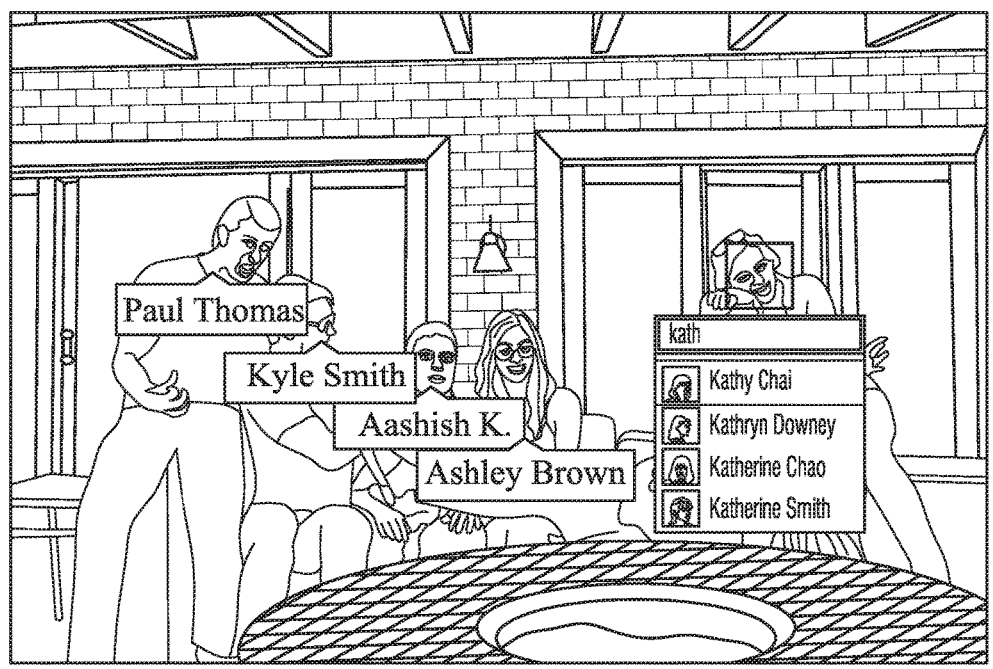
Figure 6E:
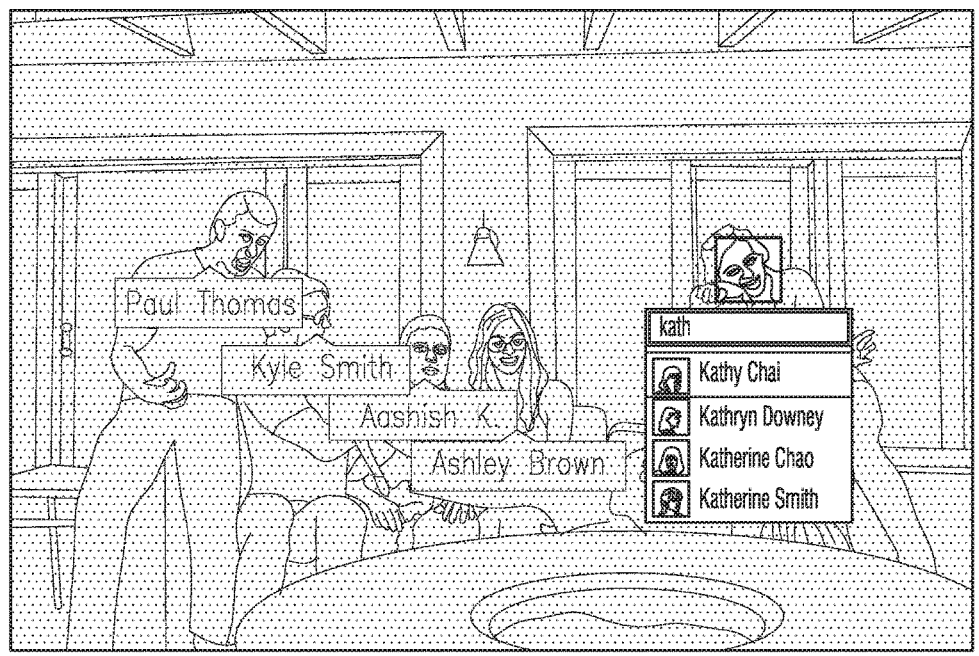

In the example illustrated in FIG. 6A, the user has selected the face of a person portrayed on the right-hand side of the image. Now referencing FIG. 6B, when the user selects the tag-label field, which asks "Who is this?", social-networking system 160 responds by generating a list of tag suggestions in a drop-down menu below the tag-label field. These tag suggestions may be generated as described previously. In particular embodiments, social-networking system 160 may determine a facial-recognition score based in part on a character string provided by a user. The calculation of a facial-recognition score may be improved by using user input and typeahead functionality, where the character string inputted by a user into a tag-label field may be used to identify candidate users by matching the character string with their name (similarly, candidate users may be filter out based on the character string if their names don't match). The matching users may then be sent to the user viewing the image as tag suggestions, which the user may select in order to tag the image for a particular user. The tag suggestions may be presented as the user enters characters into a tag-label field, with the tag suggestions being revised in real-time using typeahead functionality as the user enters more characters into the field. In particular embodiments, social-networking system 160 may receive one or more characters of a character string as a first user at a client system 130 enters the character string into a graphical user interface of a webpage associated with the image. Social-networking system may then search social graph 200 for one or more nodes that substantially match the character string. Based on the identified matching nodes, social-networking system may send to the client system 130 one or more of the tag suggestions for display on the client system 130. The tag suggestions may be displayed to the first user as the user enters the character string into the graphical user interface. The display of the tag suggestions may enable the first user to select one of the tag suggestions for automatic entry into the graphical user interface. As an example, referencing FIGS. 6C, when the user inputs the characters "ka" into the tag-label field, social-networking system 160 may search the social graph 200 to identify users having names that substantially match the character string "ka". In conjunction with the face-representation comparisons and social-graph affinity, social-networking system 160 may calculate new facial-recognition scores for users having names matching "ka" and then rank those users and present them in a drop-down menu below the tag-label field. Here, the users "Kathy Chai", "Kathryn Downey", "Katie Smith", and others are now being generated as tag suggestions. Referencing FIG. 6D, as the user continues to enter characters, here "kath", the tag suggestions are refined again, now with the user "Katie Smith" filtered out and the users "Katherine Chao" and "Katherine Smith" added to the tag suggestions. In particular embodiments, social-networking 160 may receive from the first user a selection of one of the tag suggestions. In response, social-networking system 160 may generate a tag corresponding to the particular user corresponding to the selected tag suggestion. As an example and not by way of limitation, referencing FIG. 6D, if the user selects, for example, "Kathy Chai", social-networking system 160 may respond by generating a tag associated with the user "Kathy Chai" for that location in the image. Furthermore, social-networking system 160 may then generate a tagged-in-type edge 206 connecting the user node 202 for Kathy Chai and the concept node 204 for the image. In particular embodiments, when a user selects a particular location within an image to tag, the selected portion of the image may be highlighted by obscuring the non-selected portions of the image. The non-selected portion of the image may be obscured, for example, by dimming, darkening, whiting-out, hatching, or otherwise making the non-selected portion of the image less apparent. In other words, when tagging an image, the rendering of the image may be altered so the location where the user has selected to tag is focused on. This may allow the user tagging the image to more clearly see the location or area of the image being tagged. As an example and not by way of limitation, referencing FIG. 6E, when the user selects the face of a particular person portrayed on the right-hand side of the image and entered in the text "kath" (as in FIG. 6D), social-networking system 160 may re-render the image so that the rest of the image is darkened, while leaving the area around the location selected in the image and the drop-down menu un-darkened. Although this disclosure describes performing facial recognition on images in a particular manner, this disclosure contemplates performing facial recognition on images in any suitable manner.

In particular embodiments, social-networking system 160 may notify a user that the user has been tagged in an image. If a first user tags a second user in an image, social-networking system 160 may notify the second user that the user have been tagged in that image, for example, by emailing, messaging, or otherwise notifying the second user of the tag. If this second user then accesses the image, social-networking system 160 may repeat the facial-recognition processes described previously with respect to the second user by calculating facial-recognition scores for one or more users with respect to the second user. In other words, a new set of candidate users may be identified with respect to the second user, and these candidate users may then have facial-recognition scores calculated for them with respect to the second user, and a new set of tag suggestions may be generated and displayed to the second user. This may effectively create or encourage a chain-tagging effect, where, for example, a first user may tag a second user, and a second user may tag a third user, and so on, which each user receiving a notification once they have been tagged.

In particular embodiments, social-networking system 160 may render the image with a tag-label for each user tagged in the image. The tag-label may include a description of the objects associated with the tag. As an example and not by way of limitation, referencing FIG. 3, for the four persons portrayed on the left-hand side of the image, the image is rendered showing four tag-labels for the four users tagged in the image, that is tags for the users "Paul Thomas", "Kyle Smith", "Aashish K.", "Ashley Brown". Although this disclosure describes rendering particular images in a particular manner, this disclosure contemplates rendering any suitable images in any suitable manner. More on tagging images and rendering tagged images may be found in U.S. patent application Ser. No. 13/894,640, filed 15 May 2013, which is incorporated by reference.

In particular embodiments, social-networking system 160 may send the rendered image to a browser client associated with the first user for display to the first user. The browser client may be on a client system 130 of the first user. The image may be rendered so that it can be displayed in the viewport of the client system (e.g., the display). The tag-labels associated with each tag may be displayed overlaying the image in an area proximate to the location associated with the tag. In particular embodiments, a user may select (e.g., click on) an tag and social-networking system 160 may respond in a particular manner, such as by redirecting the viewing user to the user-profile page of the selected tag, or by zooming in on the selected tag. Although this disclosure describes sending particular images in a particular manner, this disclosure contemplates sending any suitable images in any suitable manner.

Figure 7:
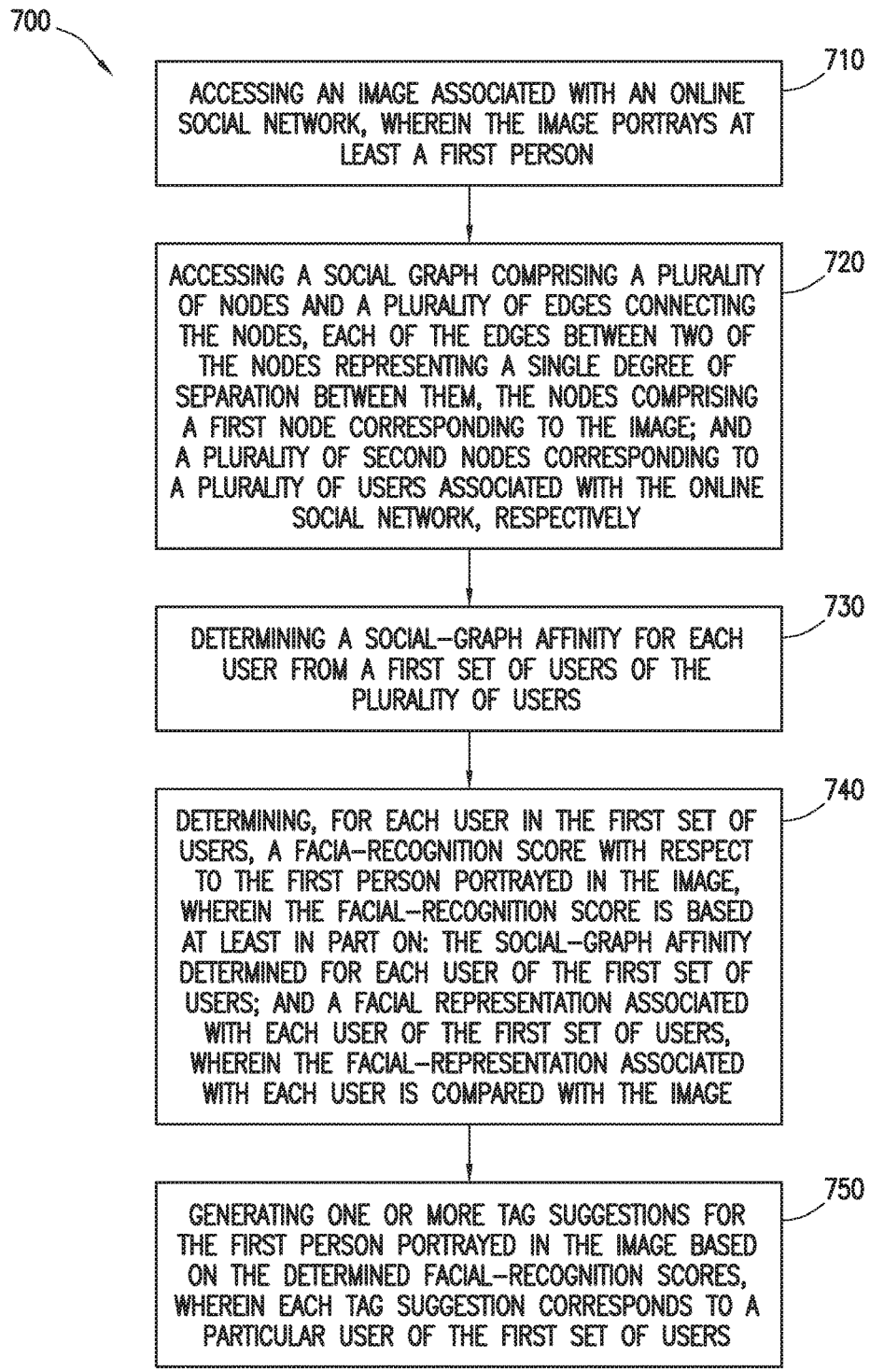
FIG. 7 illustrates an example method for suggesting tags using facial recognition.

FIG. 7 illustrates an example method 700 for suggesting tags using facial recognition. The method may begin at step 710, where social-networking system 160 may access an image associated with an online social network. The image may portray at least a first person, and in certain cases may also portray one or more second persons. One or more of the persons portrayed in the image may be tagged as corresponding to a particular user of the online social network. At step 720, social-networking system 160 may access a social graph 200 comprising a plurality of nodes and a plurality of edges connecting the nodes. The social graph 200 may comprise a first node corresponding to the image. The social graph 200 may also comprise a plurality of second nodes corresponding to a plurality of users associated with the online social network, respectively. Each edges between two of the nodes may represent a single degree of separation between them. At step 730, social-networking system 160 may determine a social-graph affinity for each user from a first set of users of the plurality of users. The social-graph affinity may be determined with respect to the image, the user who posted the image, other users tagged in the image, with respect to any other suitable concept or user of the online social network, or any combination thereof. The social-graph affinity may be determined based on a variety of factors. At step 740, social-networking system 160 may determine, for each user in the first set of users, a facial-recognition score with respect to the first person portrayed in the image. The facial-recognition score is based on a variety of factors, including, for example, the social-graph affinity determined for each user of the first set of users, or a facial-representation associated with each user of the first set of users. The facial-representation associated with each user may be compared with the image to determine how closely the facial-representation matches the first person portrayed in the image. At step 750, social-networking system 160 may generate one or more tag suggestions for the first person portrayed in the image based on the determined facial-recognition scores. Each tag suggestion corresponds to a particular user of the first set of users. Particular embodiments may repeat one or more steps of the method of FIG. 7, where appropriate. Although this disclosure describes and illustrates particular steps of the method of FIG. 7 as occurring in a particular order, this disclosure contemplates any suitable steps of the method of FIG. 7 occurring in any suitable order. Moreover, although this disclosure describes and illustrates particular components, devices, or systems carrying out particular steps of the method of FIG. 7, this disclosure contemplates any suitable combination of any suitable components, devices, or systems carrying out any suitable steps of the method of FIG. 7.

Systems and Methods

Figure 8:
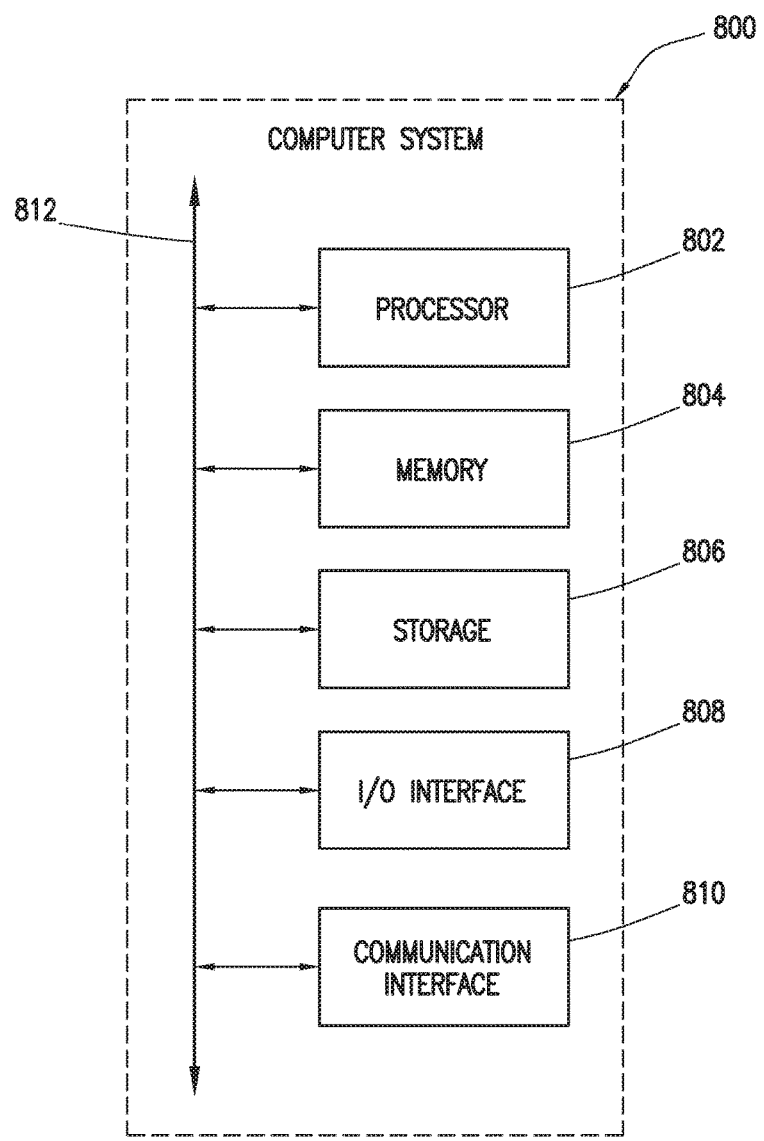
FIG. 8 illustrates an example computer system.

FIG. 8 illustrates an example computer system 800. In particular embodiments, one or more computer systems 800 perform one or more steps of one or more methods described or illustrated herein. In particular embodiments, one or more computer systems 800 provide functionality described or illustrated herein. In particular embodiments, software running on one or more computer systems 800 performs one or more steps of one or more methods described or illustrated herein or provides functionality described or illustrated herein. Particular embodiments include one or more portions of one or more computer systems 800. Herein, reference to a computer system may encompass a computing device, and vice versa, where appropriate. Moreover, reference to a computer system may encompass one or more computer systems, where appropriate.

This disclosure contemplates any suitable number of computer systems 800. This disclosure contemplates computer system 800 taking any suitable physical form. As example and not by way of limitation, computer system 800 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, or a combination of two or more of these. Where appropriate, computer system 800 may include one or more computer systems 800; be unitary or distributed; span multiple locations; span multiple machines; span multiple data centers; or reside in a cloud, which may include one or more cloud components in one or more networks. Where appropriate, one or more computer systems 800 may perform without substantial spatial or temporal limitation one or more steps of one or more methods described or illustrated herein. As an example and not by way of limitation, one or more computer systems 800 may perform in real time or in batch mode one or more steps of one or more methods described or illustrated herein. One or more computer systems 800 may perform at different times or at different locations one or more steps of one or more methods described or illustrated herein, where appropriate.

In particular embodiments, computer system 800 includes a processor 802, memory 804, storage 806, an input/output (I/O) interface 808, a communication interface 810, and a bus 812. Although this disclosure describes and illustrates a particular computer system having a particular number of particular components in a particular arrangement, this disclosure contemplates any suitable computer system having any suitable number of any suitable components in any suitable arrangement.

In particular embodiments, processor 802 includes hardware for executing instructions, such as those making up a computer program. As an example and not by way of limitation, to execute instructions, processor 802 may retrieve (or fetch) the instructions from an internal register, an internal cache, memory 804, or storage 806; decode and execute them; and then write one or more results to an internal register, an internal cache, memory 804, or storage 806. In particular embodiments, processor 802 may include one or more internal caches for data, instructions, or addresses. This disclosure contemplates processor 802 including any suitable number of any suitable internal caches, where appropriate. As an example and not by way of limitation, processor 802 may include one or more instruction caches, one or more data caches, and one or more translation lookaside buffers (TLBs). Instructions in the instruction caches may be copies of instructions in memory 804 or storage 806, and the instruction caches may speed up retrieval of those instructions by processor 802. Data in the data caches may be copies of data in memory 804 or storage 806 for instructions executing at processor 802 to operate on; the results of previous instructions executed at processor 802 for access by subsequent instructions executing at processor 802 or for writing to memory 804 or storage 806; or other suitable data. The data caches may speed up read or write operations by processor 802. The TLBs may speed up virtual-address translation for processor 802. In particular embodiments, processor 802 may include one or more internal registers for data, instructions, or addresses. This disclosure contemplates processor 802 including any suitable number of any suitable internal registers, where appropriate. Where appropriate, processor 802 may include one or more arithmetic logic units (ALUs); be a multi-core processor; or include one or more processors 802. Although this disclosure describes and illustrates a particular processor, this disclosure contemplates any suitable processor.

In particular embodiments, memory 804 includes main memory for storing instructions for processor 802 to execute or data for processor 802 to operate on. As an example and not by way of limitation, computer system 800 may load instructions from storage 806 or another source (such as, for example, another computer system 800) to memory 804. Processor 802 may then load the instructions from memory 804 to an internal register or internal cache. To execute the instructions, processor 802 may retrieve the instructions from the internal register or internal cache and decode them. During or after execution of the instructions, processor 802 may write one or more results (which may be intermediate or final results) to the internal register or internal cache. Processor 802 may then write one or more of those results to memory 804. In particular embodiments, processor 802 executes only instructions in one or more internal registers or internal caches or in memory 804 (as opposed to storage 806 or elsewhere) and operates only on data in one or more internal registers or internal caches or in memory 804 (as opposed to storage 806 or elsewhere). One or more memory buses (which may each include an address bus and a data bus) may couple processor 802 to memory 804. Bus 812 may include one or more memory buses, as described below. In particular embodiments, one or more memory management units (MMUs) reside between processor 802 and memory 804 and facilitate accesses to memory 804 requested by processor 802. In particular embodiments, memory 804 includes random access memory (RAM). This RAM may be volatile memory, where appropriate Where appropriate, this RAM may be dynamic RAM (DRAM) or static RAM (SRAM). Moreover, where appropriate, this RAM may be single-ported or multi-ported RAM. This disclosure contemplates any suitable RAM. Memory 804 may include one or more memories 804, where appropriate. Although this disclosure describes and illustrates particular memory, this disclosure contemplates any suitable memory.

In particular embodiments, storage 806 includes mass storage for data or instructions. As an example and not by way of limitation, storage 806 may include a hard disk drive (HDD), a floppy disk drive, flash memory, an optical disc, a magneto-optical disc, magnetic tape, or a Universal Serial Bus (USB) drive or a combination of two or more of these. Storage 806 may include removable or non-removable (or fixed) media, where appropriate. Storage 806 may be internal or external to computer system 800, where appropriate. In particular embodiments, storage 806 is non-volatile, solid-state memory. In particular embodiments, storage 806 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 806 taking any suitable physical form. Storage 806 may include one or more storage control units facilitating communication between processor 802 and storage 806, where appropriate. Where appropriate, storage 806 may include one or more storages 806. Although this disclosure describes and illustrates particular storage, this disclosure contemplates any suitable storage.

In particular embodiments, I/O interface 808 includes hardware, software, or both, providing one or more interfaces for communication between computer system 800 and one or more I/O devices. Computer system 800 may include one or more of these I/O devices, where appropriate. One or more of these I/O devices may enable communication between a person and computer system 800. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 808 for them. Where appropriate, I/O interface 808 may include one or more device or software drivers enabling processor 802 to drive one or more of these I/O devices. I/O interface 808 may include one or more I/O interfaces 808, where appropriate. Although this disclosure describes and illustrates a particular I/O interface, this disclosure contemplates any suitable I/O interface.

In particular embodiments, communication interface 810 includes hardware, software, or both providing one or more interfaces for communication (such as, for example, packet-based communication) between computer system 800 and one or more other computer systems 800 or one or more networks. As an example and not by way of limitation, communication interface 810 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 810 for it. As an example and not by way of limitation, computer system 800 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 800 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 800 may include any suitable communication interface 810 for any of these networks, where appropriate. Communication interface 810 may include one or more communication interfaces 810, where appropriate. Although this disclosure describes and illustrates a particular communication interface, this disclosure contemplates any suitable communication interface.

In particular embodiments, bus 812 includes hardware, software, or both coupling components of computer system 800 to each other. As an example and not by way of limitation, bus 812 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 812 may include one or more buses 812, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Miscellaneous

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, functions, operations, or steps, any of these embodiments may include any combination or permutation of any of the components, elements, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

What is claimed is:

1. A method comprising, by a client computing device of a first user:
   sending, from the client computing device of the first user to a server of an online social network, an image portraying at least a first person;
   determining, at the client computing device, for each user in a first set of users, a facial-recognition score with respect to the first person portrayed in the image, wherein the facial-recognition score is based at least in part on a facial-representation associated with the user, the facial-representation associated with the user being compared with the image;
   presenting, at the client computing device, one or more tag suggestions for the first person portrayed in the image based on the facial-recognition scores and a social-graph affinity associated with one or more users of the first set of users, wherein each tag suggestion corresponds to a particular user of the first set of users; and
   receiving, at the client computing device, a selection of a particular tag suggestion by the first user.

2. The method of claim 1, further comprising sending the selection of the particular tag suggestion to the server of the online social network.

3. The method of claim 1, wherein the social graph affinity is accessed from the server of the online social network.

4. The method of claim 1, wherein the facial-recognition score is accessed from the server of the online social network.

5. The method of claim 1, further comprising determining a social-graph affinity for each user in the first set of users.

6. The method of claim 1, further comprising:
   accessing a social graph comprising a plurality of nodes and a plurality of edges connecting the nodes, each of the edges between two of the nodes representing a single degree of separation between them, the nodes comprising:
   a first node corresponding to the image; and
   a plurality of second nodes corresponding to a plurality of users associated with the online social network, respectively.

7. The method of claim 6, wherein the social-graph affinity for each user in the first set of users is based at least in part on a degree of separation between the second node corresponding to the user and the first node corresponding to the image.

8. The method of claim 6, wherein the image comprises one or more tags corresponding to one or more second users of the plurality of users, respectively, and wherein the social-graph affinity for each user of the first set of users is based at least in part on a degree of separation between the second node corresponding to the user and the one or more second nodes corresponding to the one or more second users, respectively.

9. The method of claim 1, further comprising receiving one or more characters of a character string at the client computing device as the first user enters the character string into a user interface associated with the image.

10. The method of claim 9, further comprising determining one or more users of the online social network that substantially match the character string.

11. The method of claim 9, further comprising:
    sending, from the client computing device to the server, the character string entered by the first user; and
    receiving, at the client computing device from the server of the online social network, information associated with one or more users of the online social network that substantially match the character string.

12. The method of claim 9, wherein determining the facial-recognition score is further based at least in part on the character string.

13. The method of claim 1, further comprising generating the one or more tag suggestions by identifying each user of the first set of users having a facial-recognition score greater than a threshold facial-recognition score, wherein each identified user is generated as one of the tag suggestions.

14. The method of claim 1, further comprising rendering the image with a tag-label for the particular tag suggestion, wherein the tag-label comprises a description of the particular user corresponding to the particular tag suggestion.

15. The method of claim 1, wherein the facial-recognition score for each user measures a probability that the user matches the first person portrayed in the image.

16. The method of claim 1, wherein the social-graph affinity for each user is based at least in part on a tag-history information of the image.

17. The method of claim 1, wherein the image is associated with a first set of images, and wherein the social-graph affinity for each user is based at least in part on a tag-history information of the other images in the first set of images.

18. The method of claim 1, wherein the social-graph affinity for each user is based at least in part on a time-decay information associated with the image.

19. One or more computer-readable non-transitory storage media embodying software that is operable when executed to:
- send, from a client computing device of a first user to a server of an online social network, an image portraying at least a first person;
- determine, at the client computing device, for each user in a first set of users, a facial-recognition score with respect to the first person portrayed in the image, wherein the facial-recognition score is based at least in part on a facial-representation associated with the user, the facial-representation associated with the user being compared with the image;
- present, at the client computing device, one or more tag suggestions for the first person portrayed in the image based on the facial-recognition scores and a social-graph affinity associated with one or more users of the first set of users, wherein each tag suggestion corresponds to a particular user of the first set of users; and
- receive, at the client computing device, a selection of a particular tag suggestion by the first user.

20. A system comprising: one or more processors; and a memory coupled to the processors comprising instructions executable by the processors, the processors operable when executing the instructions to:
- send, from a client computing device of a first user to a server of an online social network, an image portraying at least a first person;
- determine, at the client computing device, for each user in a first set of users, a facial-recognition score with respect to the first person portrayed in the image, wherein the facial-recognition score is based at least in part on a facial-representation associated with the user, the facial-representation associated with the user being compared with the image;
- present, at the client computing device, one or more tag suggestions for the first person portrayed in the image based on the facial-recognition scores and a social-graph affinity associated with one or more users of the first set of users, wherein each tag suggestion corresponds to a particular user of the first set of users; and
- receive, at the client computing device, a selection of a particular tag suggestion by the first user.

* * * * *